United States Patent
Matsuki et al.

[11] Patent Number: 6,068,208
[45] Date of Patent: May 30, 2000

[54] RETRACTOR FOR USE WITH A SEAT BELT

[75] Inventors: Masuo Matsuki; Satoshi Hirase, both of Kanagawa, Japan

[73] Assignee: NSK Ltd., Tokyo, Japan

[21] Appl. No.: 08/737,415

[22] PCT Filed: Mar. 15, 1996

[86] PCT No.: PCT/JP96/00694

§ 371 Date: Feb. 13, 1997

§ 102(e) Date: Feb. 13, 1997

[87] PCT Pub. No.: WO96/28321

PCT Pub. Date: Sep. 19, 1996

[30] Foreign Application Priority Data

Mar. 16, 1995 [JP] Japan .................................. 7-083472
Mar. 17, 1995 [JP] Japan .................................. 7-084506

[51] Int. Cl.[7] .......................... B60R 22/38; B65H 75/48
[52] U.S. Cl. ............................... 242/383.2; 242/383.5; 242/383.1; 280/806; 280/807
[58] Field of Search ................. 242/383.2, 383.1, 242/383.4, 383.5; 280/806, 807; 297/478

[56] References Cited

U.S. PATENT DOCUMENTS

| | | | |
|---|---|---|---|
| 3,692,253 | 9/1972 | Curran | 242/107 |
| 4,347,992 | 9/1982 | Imai | 242/68.4 |
| 4,350,313 | 9/1982 | Adomeit | 242/107.4 |
| 4,549,705 | 10/1985 | Fohl | 242/107.4 |
| 4,726,541 | 2/1988 | Tsukamoto et al. | 242/107.4 |
| 4,729,523 | 3/1988 | Saitou et al. | 242/107.4 |
| 5,050,815 | 9/1991 | Doty et al. | 242/107.4 |
| 5,441,209 | 8/1995 | Fujimura et al. | 242/384 |

FOREIGN PATENT DOCUMENTS

| | | |
|---|---|---|
| 0123219A2 | 10/1984 | European Pat. Off. . |
| 4302739 | 8/1993 | Germany . |
| 4307012 | 9/1993 | Germany . |
| 4325546 | 2/1994 | Germany . |
| 4327135 | 2/1995 | Germany . |
| 53-66621 | 6/1978 | Japan . |
| 56-163668 | 12/1981 | Japan . |
| 5-193441 | 8/1993 | Japan . |
| 5-246303 | 9/1993 | Japan . |

OTHER PUBLICATIONS

International Search Report.

*Primary Examiner*—John Q. Nguyen
*Attorney, Agent, or Firm*—Sughrue, Mion, Zinn, Macpeak & Seas, PLLC

[57] ABSTRACT

A retractor for use with a seat belt is capable of releasing a state of end lock easily without using a complicated structure of the lock operation means for operating the lock means in the case of an emergency of a vehicle. There are provided pawls (16, 13) capable of checking the rotation of the bobbin (3) in the webbing drawing direction when the pawls are engaged with inner teeth (2a, 2c) arranged on the side plates (1a, 1b) of the retractor base (1). The pawls (16, 13) are supported so that they can be relatively moved with respect to the bobbin (3) in the rotational direction of the winding shaft by a predetermined distance. In the normal operation, the ratchet wheel (18) follows the rotation of the bobbin (3). When the ratchet wheel (18) is relatively rotated with respect to the bobbin (3) in the webbing winding direction, the pawls (16, 13) are engaged with the inner teeth (2a, 2c). When the pawls (16, 13) are relatively rotated with respect to the bobbin (3), one end of the oscillating lever member (20) to reverse the ratchet wheel (18) in the webbing winding direction is connected to the ratchet wheel (18), and the middle portion is engaged with the pawl (16), and the other end is engaged with the bobbin (3).

5 Claims, 15 Drawing Sheets

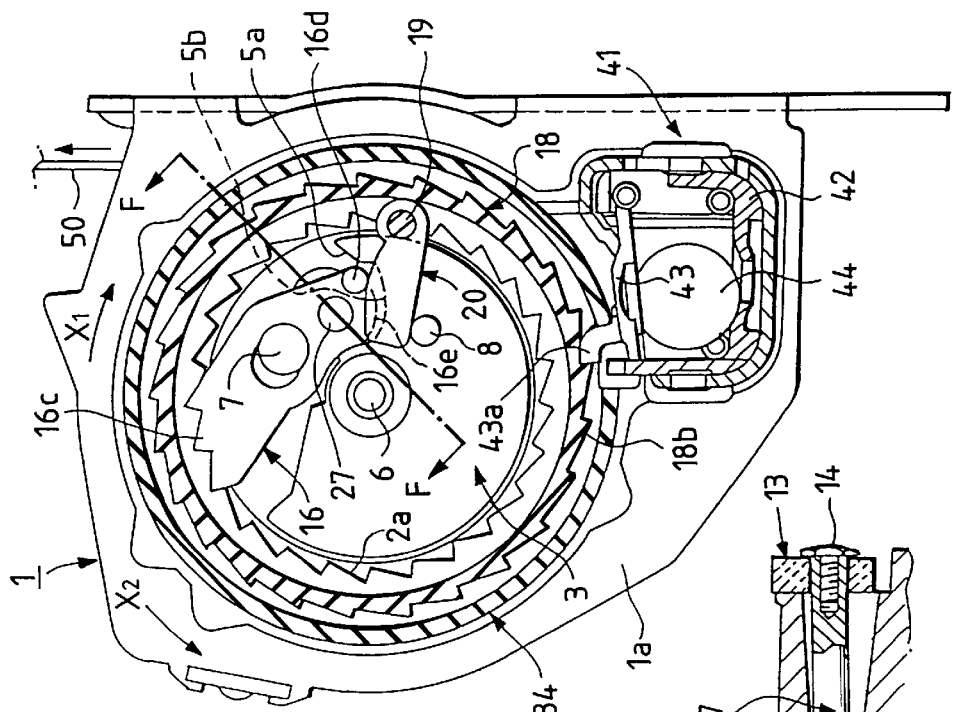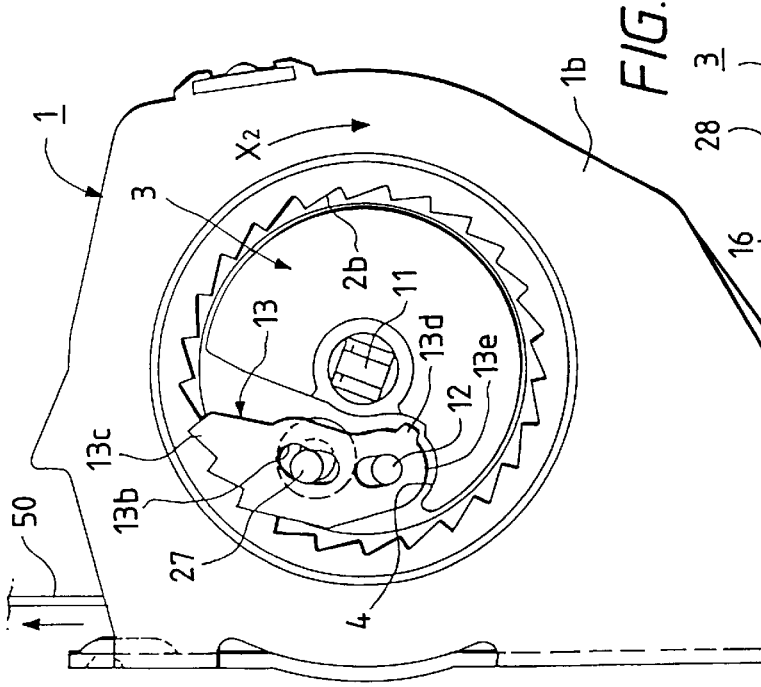

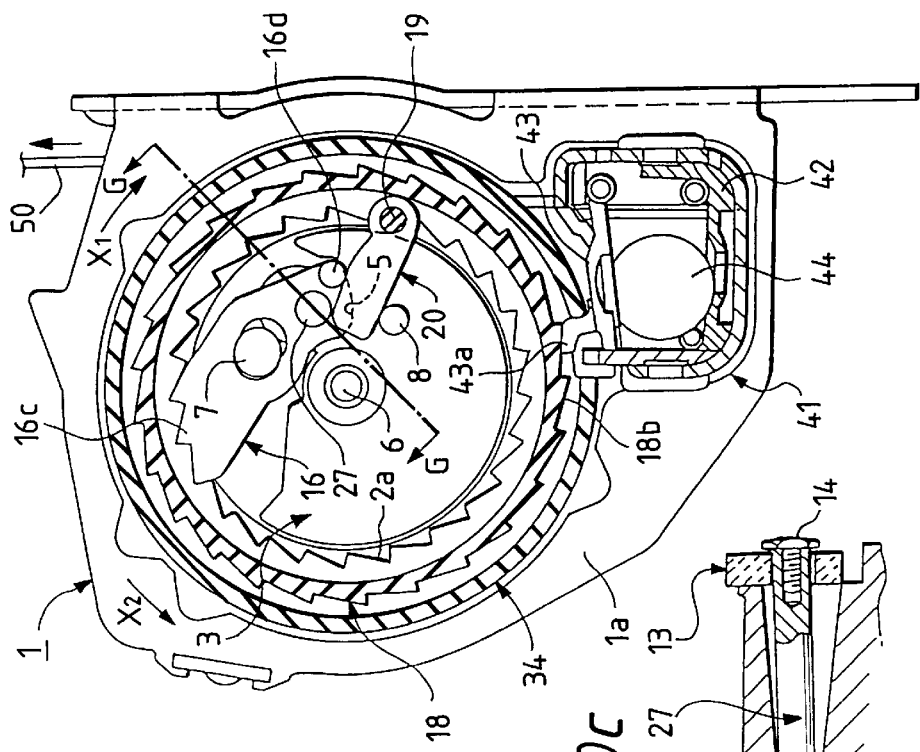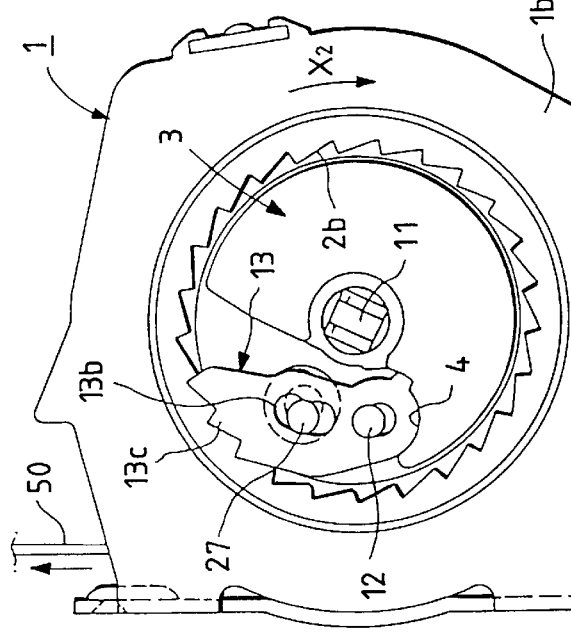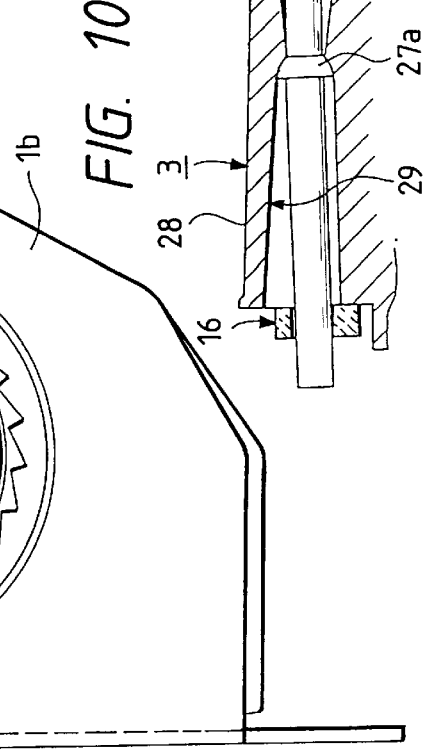
FIG. 10b
FIG. 10a
FIG. 10c

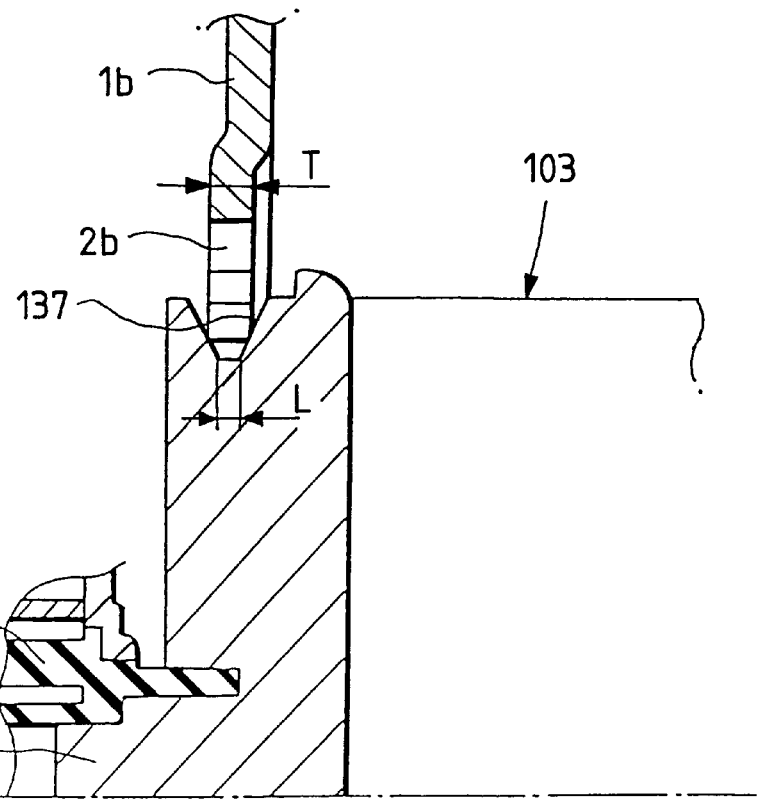
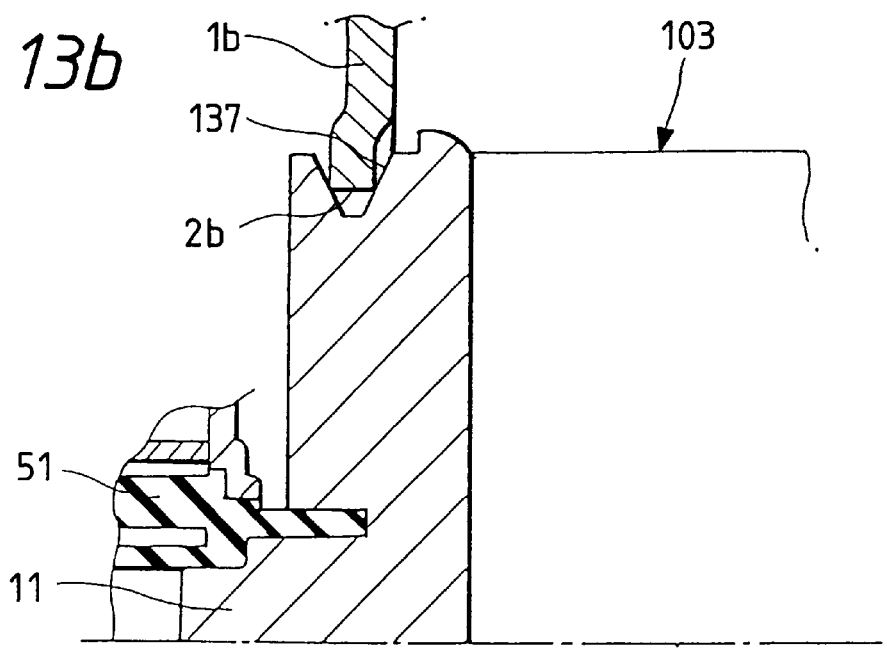

6,068,208

1

RETRACTOR FOR USE WITH A SEAT BELT

TECHNICAL FIELD

The present invention relates to a retractor (winding device) for use with a seat belt, and more particularly to improvements in a retractor for use with a seat belt having an emergency lock mechanism.

BACKGROUND ART

Concerning a retractor for use with a seat belt to safely hold a passenger in the seat of a vehicle, an emergency lock type retractor is conventionally used, which includes an emergency lock mechanism to physically lock the retractor by the action of an inertia detecting means, which responds to a sudden acceleration, shock or deceleration of the vehicle, so that the passenger can be effectively and safely restrained in the seat.

For example, Unexamined Japanese Patent Publication No. 5-246303 discloses such an emergency lock type retractor, the lock means of which operates as follows. When a lock operating means which operates by the action of a deceleration detecting means (inertia detecting means) for detecting a deceleration in the case of an emergency of a vehicle makes the first and the second engaging member provided at both ends of a reel shaft (winding shaft) to engage with the first and the second portion to be engaged which are arranged in a frame (retractor base), it is possible to prevent the reel shaft from rotating in a direction in which the webbing is drawn out.

According to the lock means of the above retractor, a plurality of engaging members are synchronously engaged with the portions to be engaged which are formed on both side walls of the frame. Therefore, in the case of necessity, it is possible to positively lock the reel shaft so that the reel shaft can not rotate in a direction in which the webbing is drawn out from the retractor, and at the same time it is possible to provide a sufficiently high engaging force. Accordingly, the reliability of the emergency lock mechanism can be enhanced.

FIGS. 14a and 14b are views to explain the operation of a main pawl (first engaging member) 61 and a lock gear (lock operation means) 64 of the lock means disclosed in the above Unexamined Japanese Patent Publication. FIG. 14a is an enlarged view showing a primary portion of the main pawl 61 at a standby position, and FIG. 14b is an enlarged view showing a primary portion of the main pawl 61 at a lock position. FIG. 15 is a cross-sectional view showing an outline of the primary portion of the retractor.

A cam shape of the cam hole 64n of the lock gear 64 is shown by a phantom line in the drawing. In this case, the cam shape of the cam hole 64n is determined as follows. When the main pawl 61 is transferred from a state shown in FIG. 14a to a state of perfect lock shown in FIG. 14b by a relative rotation of the reel shaft 63 in the direction of α, the main pawl 61 conducts a self-locking operation by the action of the teeth 62f of a side wall of the frame on a steep inclined plane side. The cam shape is determined so that the lock gear 64, which is denoted by the cam holes 64k, 64m and 64n in FIG. 14, can be a little reversed in the direction of β by the cam follower 61f via the guide cam surface $64n_2$ of the cam hole 64n. When the cam shape of the cam hole 64n is determined as described above, in the case of a perfect engagement of the main pawl 61 with the teeth 62f, an engaging claw of the lever of the deceleration detecting means not shown can be released from the engagement with the teeth of the lock gear, so that the engaging claw of the lever of the deceleration detecting means can be put into a free condition.

2

That is, when the cam follower 61f is transferred from a standby position shown in FIG. 14a to a lock position shown in FIG. 14b, an acting force of the cam follower 61f is transmitted to the lock gear 64, so that the lock gear 64 is reversed in the direction of winding the webbing by the action of the guide cam surface $64n_2$. In this way, the lock gear reverse rotation control means is composed.

In this case, the lock operation means includes a reverse rotation control means by which the lock operation means is reversed by a predetermined amount of rotation in the direction of winding the webbing. By the reverse rotation of this lock operation means, the deceleration detecting means is put into a free condition. Accordingly, the occurrence of what is called an end lock state, which will be described below, can be prevented. When all the webbing, which has been drawn out, is suddenly wound by a spring force of the winding spring, the deceleration detecting means is operated by its shock, so that the rotation of the lock gear in the direction of winding the webbing can be checked. As a result, the webbing which is in a wound condition can be neither drawn out nor wound, which is defined as an end lock state. It is described that it is possible to prevent the occurrence of this end lock state.

In order to synchronously engage the main pawl 61 arrange at one end of the reel shaft 63 and the backup pawl 70 arranged at the other end, with the teeth 62f, 62g of the frame side walls, a joint pin 69, which is an engaging portion control means, penetrates the reel shaft 63. As shown in FIG. 15, a section of the main body 69a of the joint pin 69 is formed to be circular. An arm 69b extending in a direction perpendicular to the main body 69a is formed at the right end of the joint pin 69. A cam follower 69c whose section is circular is provided at an end of the arm 69b, so that the cam follower 69c can be guided by the cam hole 64m of the lock gear. A shaft portion 69d whose section is rectangular is formed at the left end of the main body 69a in the drawing. This rectangular shaft portion 69d is inserted into a hole formed at one end of the backup pawl 70 so that it can not be relatively rotated in the hole.

When the cam follower 69c is guided by the cam hole 64m so that the arm 69b is rotated, the main body 69a is rotated, and the rotation of the main body 69a is transmitted to the backup pawl 70. Therefore, the backup pawl 70 is rotated in accordance with the motion of the cam follower 69c guided by the cam hole 64m. Accordingly, the backup pawl 70 can be linked with the rotation of the main pawl 61 which is rotated in accordance with the motion of the cam follower 61f guided by the cam hole 64n of the lock gear.

Another lock means is disclosed, for example, in Unexamined Japanese Patent Publication No. 53-66621, which will be described below. In the belt retractor disclosed in the above patent publication, a winding shaft around which the webbing is wound is displaced to a lock position in the case of an emergency of a vehicle, and an engaging portion of at least one end portion of the winding shaft protruding from the retractor side wall is engaged with a portion to be engaged which is provided on the corresponding retractor side wall, so that the rotation of the winding wall can be checked.

FIG. 16 is a side view showing an outline of the structure of the above belt retractor. A U-shaped retractor base 160 includes a pair of side walls 161 which are opposed to each other. Openings 162 which are concentric to each other are formed on the pair of side walls 161. Gears 164 serving as engaging portions are provided at both end portions of the winding shaft 163 protruding from the openings 162 to the outside of the side wall. Short shafts 165 protruding from both sides of the winding shaft 163 are rotatably supported by the holes 168 on the shaft support plates 167 attached to the side walls 161, via the bushes 169. A hole 168 on the support plate 167 is larger than the outer diameter of the bush 169, so that the winding shaft 163 can be displaced to an upper lock position, however, the winding shaft 163 is pulled to the normal operating position, which is located at a left lower position in the drawing, by the action of a tension spring 166.

At the normal operating position, the gear 164 of the winding shaft 163 is not engaged with the engaging teeth 162a, which is a portion to be engaged, formed at the inner circumferential edge of the opening 162. Since the winding shaft 163 can be freely rotated, the webbing 171 wound around the winding shaft 163 can be freely drawn out.

In the case of an emergency of a vehicle such as a collision, the sensor device 170 is operated, and the winding shaft 163 is moved to an upper lock position, resisting a drawing force of the tension spring 166. Then the gear 164 is engaged with the engaging teeth 162a, so that the rotation of the winding shaft 163 can be prevented. Accordingly, the drawing of the webbing 171 can be prevented.

However, in the case of a retractor for use with a seat belt disclosed in the above Unexamined Japanese Patent Publication No. 5-246303, the lock gear reverse rotation control means for preventing the occurrence of an end lock state is composed of a guiding cam surface 64$n_2$ of the cam hole 64$n$ and a cam follower 61f. Therefore, a complicated reverse rotation controlling operation is conducted on the lock operation means. Accordingly, it is necessary to provide a complicated cam shape, and at the same time a high accuracy is required of the size of each component and further the assembling accuracy must be high.

The joint pin 69, which is a control means for controlling the engaging member, makes the teeth 62f and 62g formed on the side walls of the frame to simultaneously engage with the main pawl 61 and the backup pawl 70. This joint pin 69 must have the arm 69b, shaft 69d and cam follower 69c as described above. Therefore, the shape of the joint pin 69 becomes complicated. Further, due to the twisting rotation of the main body 69a, the joint pin 69 makes the main pawl 61 to link with the backup pawl 70. Therefore, when an excessively strong drawing force acts on the webbing and an impulsive torque is given to the joint pin 69, an impulsive twisting force is given to the base portion of the arm 69b and the shaft 69d with which one end of the backup pawl 70 is engaged. Accordingly, there is a possibility that these components are damaged.

Accordingly, concerning the lock operation means, it is necessary to enhance the mechanical strength of each component, and it is also necessary to severely manage the fluctuation of the size of each component and the assembling accuracy. Therefore, the manufacturing cost might be raised. In the lock means described in Unexamined Japanese Patent Publication No. 53-66621, when the engaging portion which is engaged with the portion to be engaged, provided on the retractor side wall, is arranged only at one end portion of the winding shaft, an engaging force to resist the drawing force of the webbing must be supported only by the side wall on one side even when an excessively strong tension is applied to the webbing in the case of a collision of a vehicle. For this reason, the mechanical strength required to the engaging portion and the portion to be engaged is increased, so that the degree of freedom of design is lowered.

In the case of the above belt retractor in which the engaging portion is engaged with the portion to be engaged when the winding shaft is displaced to the lock position in the case of an emergency of a vehicle, in order to hold the winding shaft 163, which is supported being capable of moving in the radial direction, at the normal position and stably conduct the winding and drawing operation, it is necessary to increase a spring force of the tension spring 166. Therefore, the size of the tension spring 166 is increased, and the frictional force of the short shaft 165 is increased. Consequently, the spacing efficiency of the retractor is deteriorated, and it is necessary to increase the winding capacity of the winding spring, and it is also necessary to enhance the machining accuracy and coating performance of the short shaft 165. In the case of a retractor in which the winding shaft is held at the normal operating position by a resin cover, the winding shaft is repeatedly displaced to prevent the webbing from being drawn out when the brake is suddenly applied in a case except for a collision of a vehicle. Accordingly, the resin cover is deteriorated and deformed, and there is a possibility that the accommodated sensors are damaged.

In the case of a winding shaft in which the body having the engaging portion is formed separately from the reel flange, in order to integrate the winding shaft with the reel flange, there is a possibility that the engaging portion of the winding shaft is not positively engaged with the portion to be engaged, on the retractor side wall unless the flange portion and the body are positioned with high accuracy.

Therefore, a first object of the present invention is to provide a highly efficient and inexpensive retractor for use with a seat belt, without using a complicated structure of the lock operation means which operates in the case of an emergency of a vehicle.

A second object of the present invention is to provide a highly efficient and inexpensive retractor for use with a seat belt, in which a pair of engaging elements arranged at both ends of the winding shaft can be simultaneously engaged with the portions to be engaged, on the retractor base.

A third object of the present invention is to provide a highly efficient retractor for use with a seat belt, having a lock means for obtaining a sufficiently high webbing engaging force even if the structure is simple.

DISCLOSURE OF INVENTION

The first object of the present invention is accomplished by a retractor for use with a seat belt comprising an emergency lock mechanism including: a lock means for preventing a winding shaft from rotating in a direction of drawing out the webbing from the winding shaft when an engaging member arranged at least one end of the winding shaft around which the webbing is wound is engaged with a portion to be engaged, on a retractor base; a lock operation means for operating the lock means when the lock operation means is relatively rotated with respect to the winding shaft in the webbing winding direction, in which the lock operation means usually rotates following the rotation of the winding shaft; an inertia detecting means to be operated in the case of an emergency of a vehicle; and an engaging means for checking the rotation of the lock operation means in the webbing drawing direction in accordance with the operation of the inertia detecting means, the retractor for use with a seat belt further comprising: a means for supporting the engaging member so that the engaging member can be relatively moved with respect to the winding shaft in the winding shaft rotating direction by a predetermined amount of rotation; and a reverse rotation means for rotating the lock operation means in a direction reverse to the webbing winding direction by the rotation of the winding shaft in the webbing drawing direction after the engaging member is engaged with the portion to be engaged with.

According to the preferred embodiment, the reverse rotation means includes an oscillating lever, one end portion of which is connected with the lock operation means, the middle portion of which is engaged with the engaging member, and the other end portion of which is engaged with the winding shaft. According to another preferred embodiment, the means for supporting the engaging member includes a support shaft arranged at a position eccentric to the axial center of the winding shaft, a shaft hole loosely engaged with the support shaft, formed in the engaging member, and a means for obstructing a relative movement of the engaging member in the winding shaft rotating direction in the normal operation.

According to the above arrangement, when the engaging means prevents the rotation of the lock operation means in the webbing drawing direction in accordance with the operation of the inertia detecting means in the case of an emergency of a vehicle, the lock operation means is relatively rotated with respect to the winding shaft in the webbing winding direction. Therefore, the lock means is operated. After the engaging member of the lock means operated by the lock operation means has engaged with the portion to be engaged, the lock operation means is reversed in the webbing winding direction when the winding shaft is further rotated in the webbing drawing direction. At this time, engagement of the engaging means, which prevents the rotation of the lock operation means in the webbing drawing direction, is released.

Accordingly, the engagement to prevent the webbing from being drawn out is conducted only by the engagement between the engaging member and the portion to be engaged. An amount of rotation of the winding shaft necessary for releasing the engagement conducted by these components can be reduced to a value smaller than that of the condition in which the engaging means is engaged with the lock operation means.

Therefore, it is possible to provide a highly efficient and inexpensive retractor for use with a seat belt, without using a complicated structure of the lock operation means which operates in the case of an emergency of a vehicle.

The second object of the present invention is to provide a retractor for use with a seat belt comprising an emergency lock mechanism including: a lock means for preventing a winding shaft from rotating in a direction of drawing out the webbing from the winding shaft when a pair of engaging members arranged at both ends of the winding shaft around which the webbing is wound is engaged with a portion to be engaged, on a retractor base; and a lock operation means for operating the lock means in the case of an emergency of a vehicle when the lock operation means is relatively rotated with respect to the winding shaft in the webbing winding direction, in which the pair of engaging members are respectively engaged with both oscillating end portions of a control pin extending along a rotational center axis of the winding shaft and arranged in the winding shaft in such a manner that the control pin can be oscillated while a substantially central portion of the control pin is made to be a center of oscillation, and the control pin oscillated by the lock operation means makes the pair of engaging members to engage with the portions to be engaged.

According to the above arrangement, by the lock operation means operated in the case of an emergency of a vehicle, the control pin is oscillated while the center of oscillation is maintained at the substantially central portion of the control pin itself. Then the pair of engaging members engaged with both oscillating end portions of the control pin are respectively oscillated and rotated, so that both engaging members are simultaneously engaged with the engaging portions to be engaged.

Accordingly, the control pin to simultaneously engage both engaging members with the portions to be engaged is not given a twisting force in the case of oscillation of both engaging members. It is not necessary for the control pin to be provided with an arm to rotate one engaging member being linked with the engaging motion of the other engaging member when the engaging member is engaged with the portion to be engaged. Therefore, the structure can be made simple, and the assembling is easy.

That is, it is possible to provide a highly efficient and inexpensive retractor for use with a seat belt, in which a pair of engaging elements arranged at both ends of the winding shaft can be simultaneously engaged with the portions to be engaged, on the side walls of the retractor base.

The third object of the present invention can be accomplished by a retractor for use with a seat belt comprising: a retractor base having a pair of base side plates opposed to each other on which portions to be engaged are respectively formed and through-holes are also formed; a winding shaft around which the webbing is wound, penetrating both through-holes, made of material softer than the material of the retractor base; an engaging member arranged at one end portion of the winding shaft, capable of engaging with one of the portions to be engaged; an annular engaging surface arranged at the other end portion of the winding shaft, capable of engaging with the other portion to be engaged; and a supporting means for supporting the other end portion of the winding shaft in such a manner that the other end portion of the winding shaft can approach the other portion to be engaged by a webbing drawing force, the intensity of which is higher than a predetermined value.

According to a preferred embodiment, a groove, the section of which is substantially a V-shape, is formed on the annular engaging surface. According to another preferred embodiment, the annular engaging surface is subjected to knurling.

According to the above arrangement, when a webbing drawing force, the intensity of which is not more than a predetermined value, is applied to the webbing in the case of a sudden braking operation, the engaging member arranged at one end portion of the winding shaft is engaged with one of the portions to be engaged, so that the winding shaft can be prevented from rotating in the webbing drawing direction. When a webbing drawing force, the intensity of which is not less than a predetermined value, is applied to the webbing in the case of a collision of a vehicle, the supporting means is deformed, and the annular engaging surface provided at the other end portion of the winding shaft is also engaged with the other portion to be engaged.

Accordingly, it is possible to support an engaging force which resists a webbing drawing force, the intensity of which is higher than a predetermined value, by both base side plates. Therefore, compared with a case in which an excessively high engaging force is supported only by the lock means provided at one end portion of the winding shaft, it is possible to reduce the mechanical strength of the lock means. As a result, the degree of freedom of design can be enhanced. Since the other end portion of the winding shaft is rotatably supported by the supporting means, it is easy to conduct a stable rotating motion in the normal operation. Further, it is not necessary for the lock means, which is composed of the annular engaging surface at the other end portion of the winding shaft and the other portion to be engaged, to have a claw member and a spring. Therefore, the number of parts is not increased. Furthermore, when the supporting means is deformed, collision energy can be absorbed. That is, it is possible to provide a highly efficient retractor for use with a seat belt by a simple structure, which has a lock means for obtaining a sufficiently high webbing engaging force.

BRIEF DESCRIPTION OF DRAWINGS

FIGS. 9a and 9b are enlarged cross-sectional views of the primary portion on the winding spring side and the sensor side of the retractor for use with a seat belt shown in FIG. 3, in which the view explains a lock operation conducted by a vehicle acceleration detecting means so as to prevent the webbing from being drawn out;

FIG. 9c is a cross-sectional view taken on line F—F showing a state of the control pin at that time;

FIGS. 10a and 10b are enlarged cross-sectional views of the primary portion on the winding spring side and the sensor side of the retractor for use with a seat belt shown in FIG. 3, in which the views explain a lock operation conducted by a vehicle acceleration detecting means so as to prevent the webbing from being drawn out;

FIG. 10c is a cross-sectional view taken on line G—G showing a state of the control pin at that time;

FIGS. 13a and 13b are enlarged cross-sectional views of the primary portion for explaining a state of the lock of a bobbin conducted by the lock means in the second embodiment;

FIG. 14a is an enlarged view showing a primary portion when the main pawl is at a standby position, and FIG. 14b is an enlarged view showing a primary portion when the main pawl is at a lock position;

BEST MODE FOR CARRYING OUT THE INVENTION

Referring to the accompanying drawings, an embodiment of the present invention will be explained in detail as follows.

Figure 1:
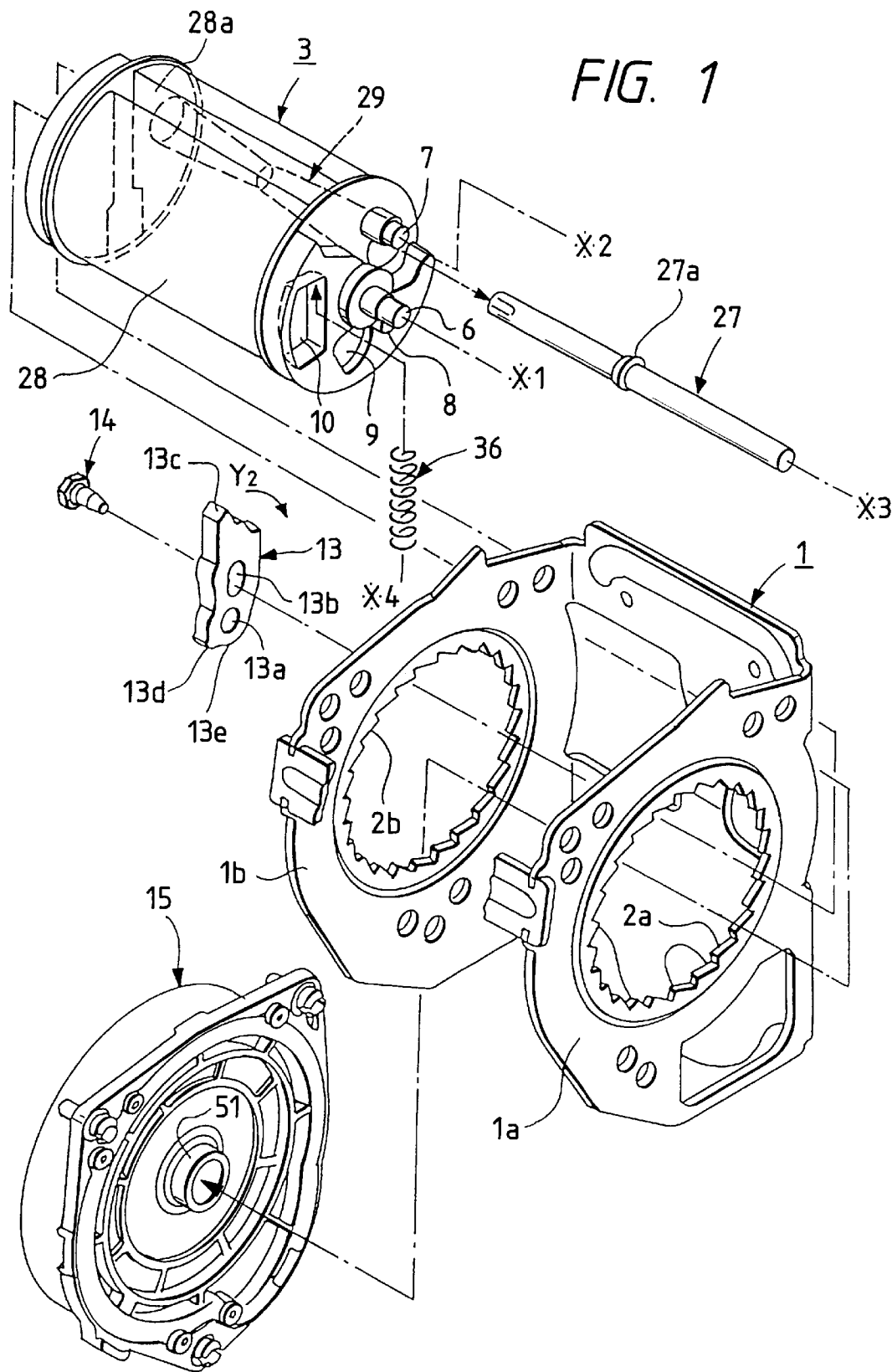
FIG. 1 is an exploded perspective view of a retractor for use with a seat belt according to the first embodiment of the present invention.
Figure 2:
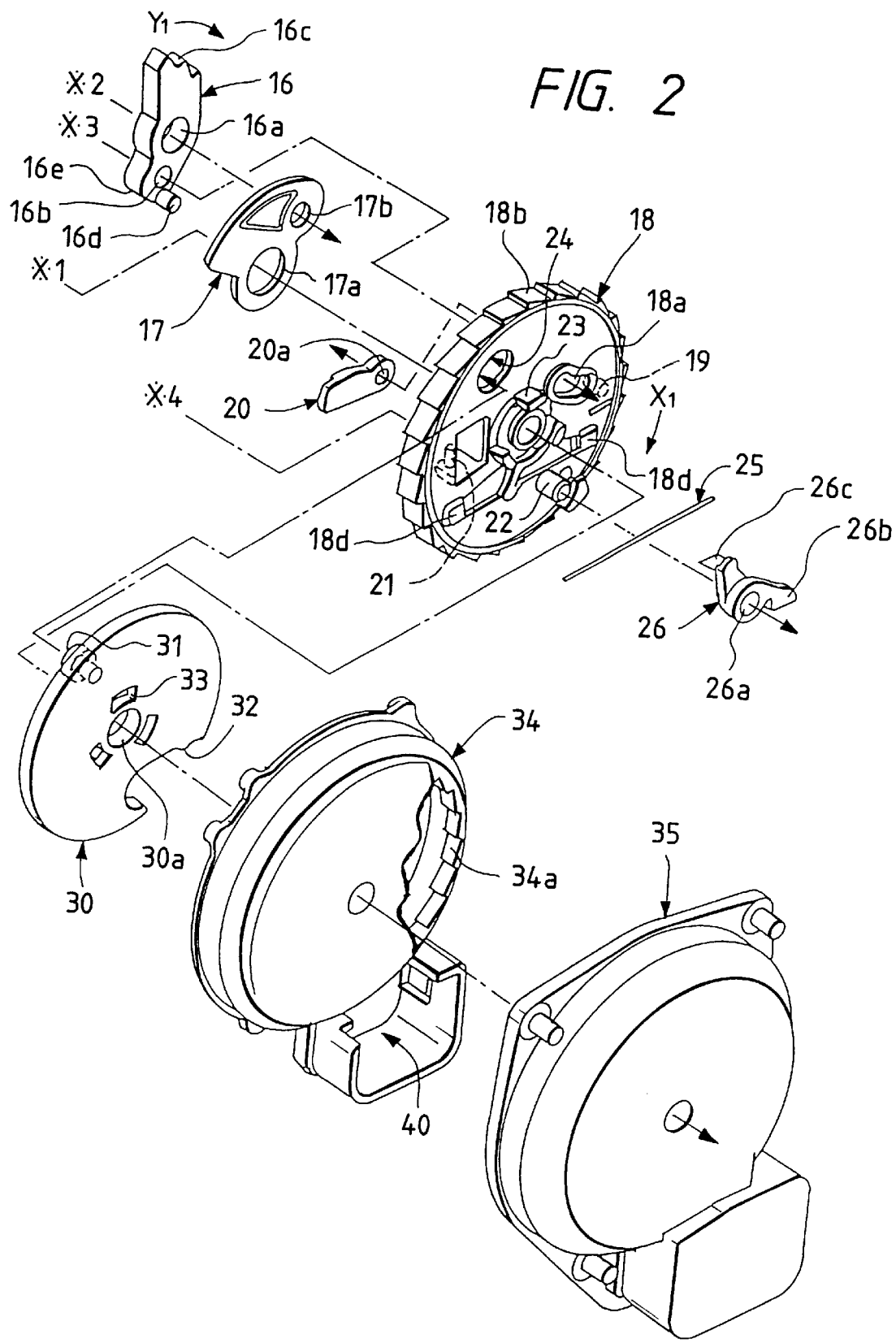
FIG. 2 is an exploded perspective view of the residual portion of the retractor for use with a seat belt shown in FIG. 1.
Figure 3:
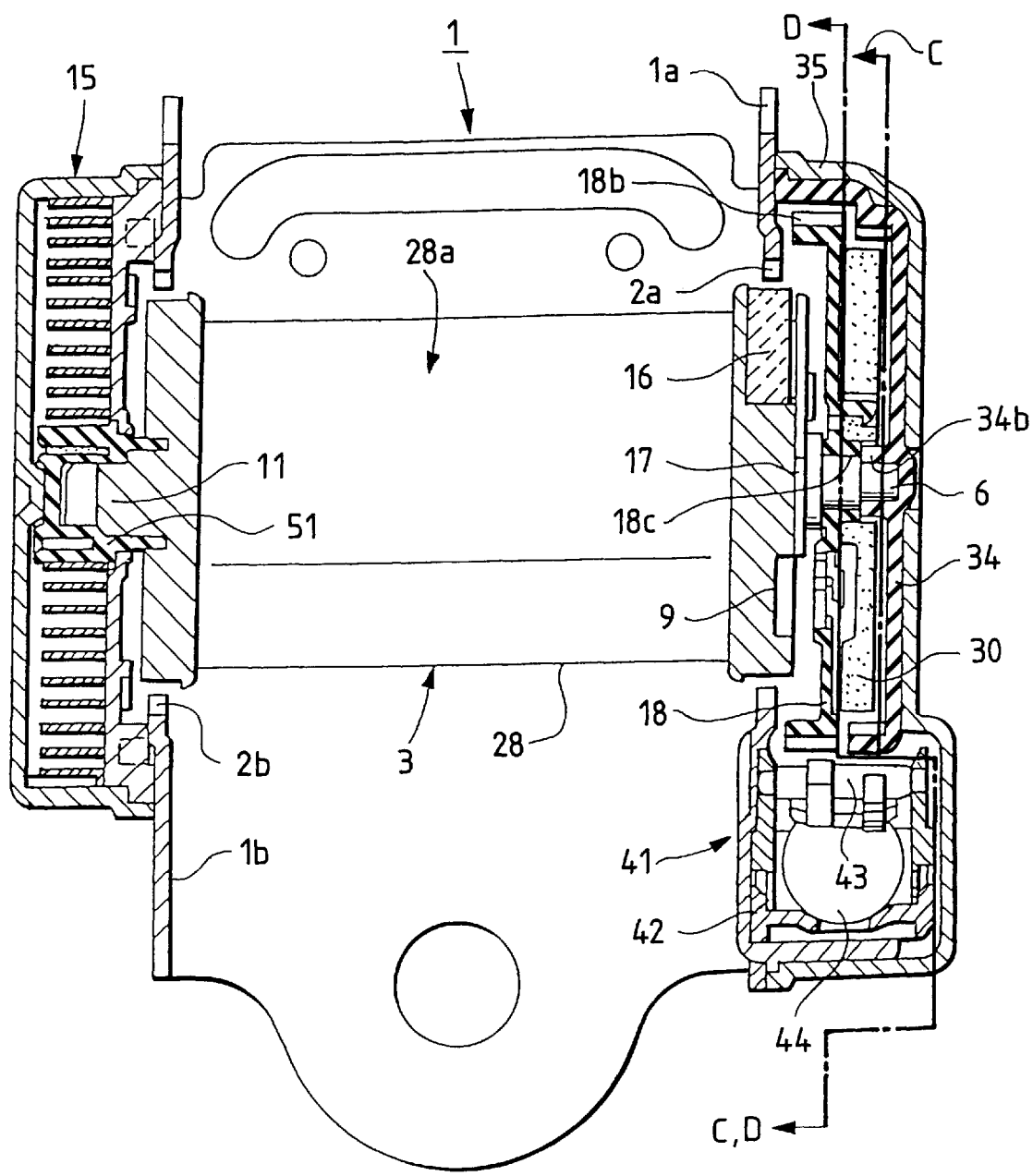
FIG. 3 is a longitudinal front cross-sectional view of the retractor for use with a seat belt according to the first embodiment of the present invention.

FIGS. 1 and 2 are exploded perspective views of the retractor for use with a seat belt according to the first embodiment of the present invention, and FIG. 3 is a longitudinal front cross-sectional view. A main portion of the retractor base 1 is formed into a C-shape. The retractor base 1 includes base side plates 1a, 1b which are opposed to each other. Through-holes are formed on the base side plates 1a, 1b, respectively. A bobbin 3, which is a winding shaft around which the webbing is wound, is inserted into these through-holes and rotatably supported by the base side plates 1a, 1b. Inner teeth 2a, 2b are formed on the inner circumferential edges of these through-holes, in which the inner teeth 2a, 2b are portions to be engaged with the engaging members arranged at both ends of the bobbin 3. In order to enhance the mechanical strength of the base side plates 1a, 1b, outer peripheries of the inner teeth 2a, 2b are subjected to the treatment of drawing. A well known spring type winding device 15 is provided at the end portion of the bobbin 3 on the side of the base side plate 1b, so that the bobbin 3 is always energized in a direction so that the webbing can be wound. In the following explanations, the left of the members extending in the transverse direction in FIGS. 1, 2 and 3 is referred to as "a side of the winding spring device", and the right is referred to as "a side of the sensor".

Figure 4A:
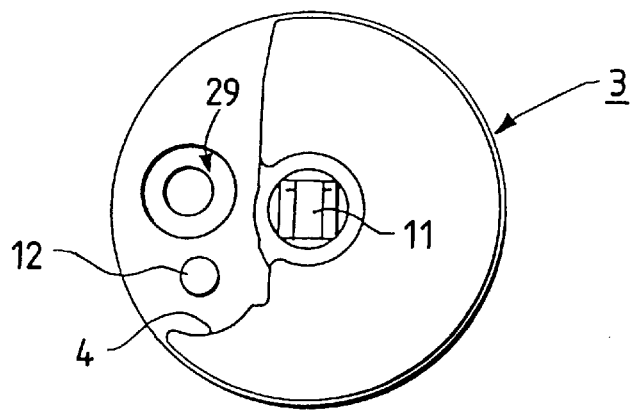
FIGS. 4a and 4b are side views of both ends of the bobbin shown in FIG. 1.
Figure 4B:
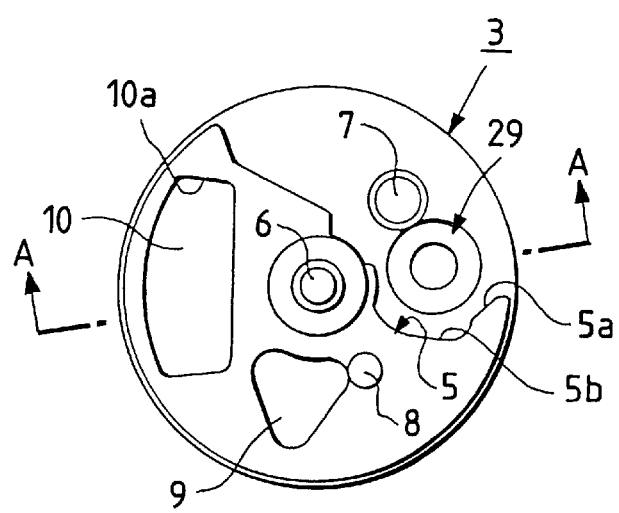
Figure 4C:
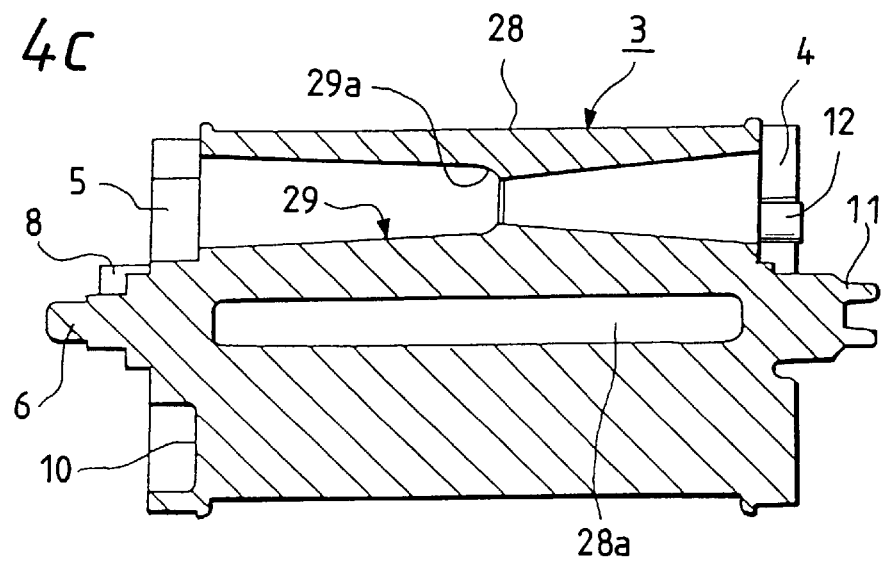
FIG. 4c is a cross-sectional view of the bobbin taken on line A—A in FIG. 4b.

As shown in FIGS. 4a, 4b and 4c, the bobbin 3 is a substantially cylindrical winding shaft integrally made of aluminum alloy. A slit opening 28a is formed in a barrel portion 28 of the bobbin 3 around which the webbing is wound, in which the slit opening 28a penetrates the radial direction for holding an end portion of the webbing. A pin through-hole 29 is formed in the bobbin 3, in which the pin through-hole 29 extends along the rotational axis of the bobbin. A throttle portion is formed at the center of this pin through-hole 29, and conic spaces extend from the throttle portion to both end faces of the pin through-hole 29. A semispherical pin supporting portion 29a is formed in the central throttle portion of this pin through-hole 29. A circular rod-shaped control pin 27 is inserted into the pin through-hole 29. A semispherical engaging portion 27a is formed in the middle of the control pin 27, in which the spherical radius of the semispherical engaging portion 27a is a little smaller than the spherical radius of the pin support portion 29a. The control pin 27 is inserted into the pin through-hole 29 from the left opening shown in FIG. 4c so that the engaging portion 27a can be contacted with the pin support portion 29a. In this way, the control pin 27 is arranged in the pin through-hole 29 so that the control pin 27 can oscillate around the engaging portion 27a.

As shown in FIGS. 4a and 4b, rotational support shafts 6, 11 for rotatably supporting the bobbin 3 are provided on both end surfaces of the bobbin 3, and also there are provided support shafts 7, 12 for rotatably supporting the pawls 16, 13 which are engaging members capable of engaging with the inner teeth 2a, 2b. These support shafts 6, 11 of the bobbin 3 are respectively supported by a shaft support portion 34b of a gear case 34 described later and a retainer 51 which is a winding shaft of the winding spring device 15. When the pawls 16, 13 are oscillated in a direction so that the pawls 16, 13 can be engaged with the inner teeth 2a, 2b, rear end portions 16e, 13e of the pawls 16, 13, which are arranged on an opposite side to the engaging teeth 16c, 13c, are positioned, and when the engaging teeth 16c, 13c are given a heavy load by the inner teeth 2a, 2b, the load is received by pressure receiving surfaces 5, 4 formed on both end surface of the bobbin 3. The sensor side end surface of the bobbin 3 shown in FIG. 4b includes: an accommodation recess 10 for accommodating a compressive coil spring 36 that pushes and rotates a ratchet wheel 18, which is a lock operation means described later, in the webbing drawing direction; an engaging protrusion 8 for restricting the counterclockwise rotation of an oscillating lever 20 supported by the ratchet wheel 18; and a recess 9 by which the interference with an arm portion 26c of the lock arm 26 for pushing a sensor spring 25 described later can be prevented.

A long hole 13b which is loosely engaged with the end of the control pin 27 is formed at the center of the pawl 13 on the winding spring device side. The long hole 13b protrudes from the through-hole 29 of the bobbin 3. A shaft hole 13a loosely engaged with the support shaft 12 is formed between the long hole 13b and the pawl rear end portion 13e. Since the shaft hole 13a is loosely engaged with the support shaft 12, the pawl 13 is supported by the support shaft 12 in such a manner that the pawl 13 is capable of oscillating and rotating with respect to the support shaft 12 while the pawl 13 can be relatively moved by a predetermined distance with respect to the support shaft 12. A tapping screw 14 is screwed to the end portion of the control pin 27 on the winding spring device side, which penetrates the long hole 13b of the pawl 13. A flange portion of the tapping screw 14 prevents the pawl 13 from rising from the end surface of the bobbin 3 on the winding spring device side.

Figure 8:
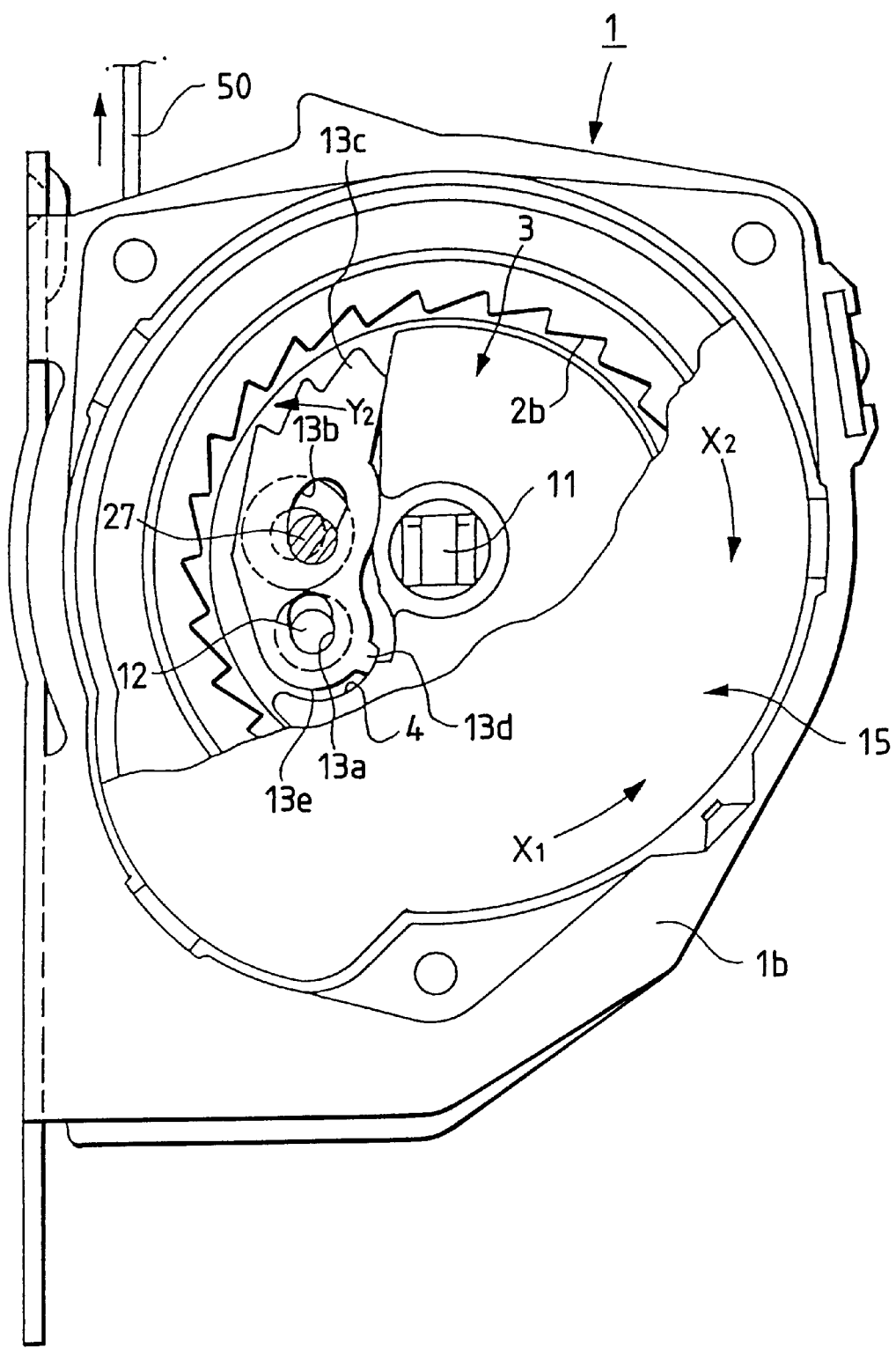
FIG. 8 is an enlarged cross-sectional view of the primary portion on the winding spring device side of the retractor for use with a seat belt shown in FIG. 7.

A protrusion 13d is formed at the rear end portion 13e of the pawl 13. The protrusion 13d comes into contact with the pressure receiving surface 4 so that the pawl 13 can not rotate spontaneously in the engaging direction with the inner teeth 2b in the case where the emergency lock mechanism is not operated (shown in FIG. 8). When the pawl 13 is rotated in the engaging direction with the inner teeth 2b in the case of operation of the emergency lock mechanism, the protrusion 13d is released from the pressure receiving surface 4, so that the pawl 13 can be rotated until the rear end portion 13e of the pawl 13 comes into contact with the pressure receiving surface 4.

A shaft hole 16a which is loosely engaged with the support shaft 7 is formed at the center of the pawl 16. A long hole 16b is formed between the shaft hole 16a and the rear end portion 16e of the pawl. The long hole 16b is loosely engaged with the sensor side end of the control pin 27 which protrudes from the pin through-hole 29 of the bobbin 3. Since the shaft hole 16a is loosely engaged with the support shaft 7, the pawl 16 is supported by the support shaft 7 in such a manner that the pawl 16 is capable of oscillating and rotating with respect to the support shaft 7 while the pawl 16 can be relatively moved by a predetermined distance with respect to the support shaft 7.

However, in the normal operation, the rear end portion 16e of the pawl is opposed to the first pressure receiving surface 5a of the pressure receiving surface 5 of the bobbin 3. Accordingly, when the first pressure receiving surface 5a comes into contact with the rear end portion 16e of the pawl, the pawl 16 is prevented from relatively moving in the longitudinal direction of the shaft hole 16a with respect to the support shaft 7, that is, the pawl 16 is prevented from relatively moving in the direction of the rotation of the winding shaft.

In the case of an emergency of a vehicle, when the pawl 16 oscillates and rotates around the support shaft 7 and the rear end portion 16e of the pawl is opposed to the second pressure receiving surface 5b, a gap is formed between the rear end portion 16e and the pressure receiving surface 5b (shown in FIG. 9b). Accordingly, the pawl 16 is capable of relatively rotating in the rotating direction of the winding shaft.

The rotating support shaft 6 of the bobbin 3 penetrates the through-hole 17a of the holding plate 17. In an engaging hole 17b of the holding plate 17, a front end of the support shaft 7 penetrating the shaft hole 16a of the pawl 16 is attached. The holding plate 17 prevents the pawl 16 from rising from the end surface of the bobbin 3.

The end portion of the control pin 27 on the sensor side penetrates the long hole 16b of the pawl 16. This end portion of the control pin 27 is inserted into a cam hole 18a formed in the ratchet wheel 18, which is arranged outside the holding plate 17, rotatably supported by the rotating support shaft 6 of the bobbin 3.

When the ratchet wheel 18 is relatively rotated in the webbing winding direction (the direction of arrow $X_1$ in FIG. 2) with respect to the bobbin 3, the cam hole 18a moves the end portion of the control pin 27 on the sensor side to the rotational center side. As a result, the pawl 16 is oscillated and rotated around the support shaft 7 in the engaging direction with the inner teeth 2a, that is, in the direction of arrow $Y_1$.

At this time, the control pin 27 is arranged in the pin through-hole 29 while the control pin 27 can be oscillated around the engaging portion 27a. Accordingly, the end portion of the control pin 27 on the winding spring device side moves in a direction so that the end portion can be separated from the rotational center axis of the bobbin 3. Therefore, the long hole 13b of the pawl 13 is pushed away, and the pawl 13 is oscillated and rotated around the support shaft 12 in the engaging direction with the inner teeth 2b, that is, in the direction of arrow $Y_2$ in FIG. 1.

That is, the lock means is composed as follows. The pair of pawls 16, 13 engaged with both oscillating end portions of the control pin 27 are respectively rotated in the engaging direction with the inner teeth 2a, 2b. When the engaging teeth 16c, 13c of both pawls 16, 13 are simultaneously engaged with the inner teeth 2a, 2b, the rotation of the bobbin 3 in the webbing drawing direction is checked. In this way, the lock means is composed.

Consequently, since the pawls 16, 13 are simultaneously engaged with the inner teeth 2a, 2b, the control pin 27 is not given a twisting force when both pawls 16, 13 are oscillated. It is not necessary for the control pin 27 to have an arm to rotate one pawl 13 to be engaged with the inner teeth while the pawl 13 is linked with the other pawl 16. Therefore, the structure can be made simple and the assembling can be made easy.

In this connection, when the engaging member control means for synchronizing a pair of engaging members provided at both ends of the bobbin is of the conventional type in which one engaging member is linked with the other engaging member by the twist rotation of a rod inserted into the bobbin, the following problems may be encountered. When the inner surface of the through-hole for inserting the joint pin is greatly tapered, that is, when the inner surface of the through-hole for inserting the joint pin has a large draft, the joint pin is rickety in the through-hole, and it impossible to positively synchronize the engaging members. For this reason, it is impossible to increase the draft of a core when the through-hole is formed. When the shape of the joint pin is formed in accordance with the tapered shape of the through-hole so as to set the joint pin in the through-hole in a stable condition, it is necessary to enhance the machining accuracy of the joint pin, and the manufacturing cost is raised.

However, according to the engaging member control means of the present invention, the through-hole 29 into which the control pin 27 is inserted is formed by combining conic spaces which extend from the central throttle portion to both end surfaces. Accordingly, when the bobbin is integrally formed, the draft of the core to form the pin through-hole 29 is increased, so that the core can be easily drawn out. It is not necessary to machine the control pin 27 with high accuracy except for the engaging portion 27a. Therefore, the manufacturing cost can be reduced.

The ratchet wheel 18 is a wheel around which teeth are provided, and the center hole of the ratchet wheel 18 is rotatably supported by the rotational support shaft 6 of the bobbin 3. Ratchet teeth 18b are formed in the outer circumference of the ratchet wheel 18, which are to be engaged with the sensor arm 43 of the vehicle acceleration detecting means 41 described later, in which the ratchet teeth are directed in the belt drawing direction. In the periphery of the center hole of the ratchet wheel 18, a boss portion 18c protrudes toward the outside of the retractor (shown in FIG. 3). This boss portion 18c supports a center hole 30a of the inertia pressure plate 30 which is a disk-shaped inertial body to compose the webbing acceleration detecting means for detecting the acceleration of the drawing speed of the webbing. An engaging claw portion 23 is protruded in the periphery of the boss portion 18c. This engaging claw portion 23 positions the inertia plate 30 in the thrust direction. An engaging protrusion 31 of the inertia pressure plate 30 is engaged in the long hole 24 formed in the ratchet wheel 18. One end portion 24a (shown in FIG. 6) of the long hole 24 positions the inertia plate 30 in the rotational direction when the emergency lock mechanism is not operated.

Figure 6:
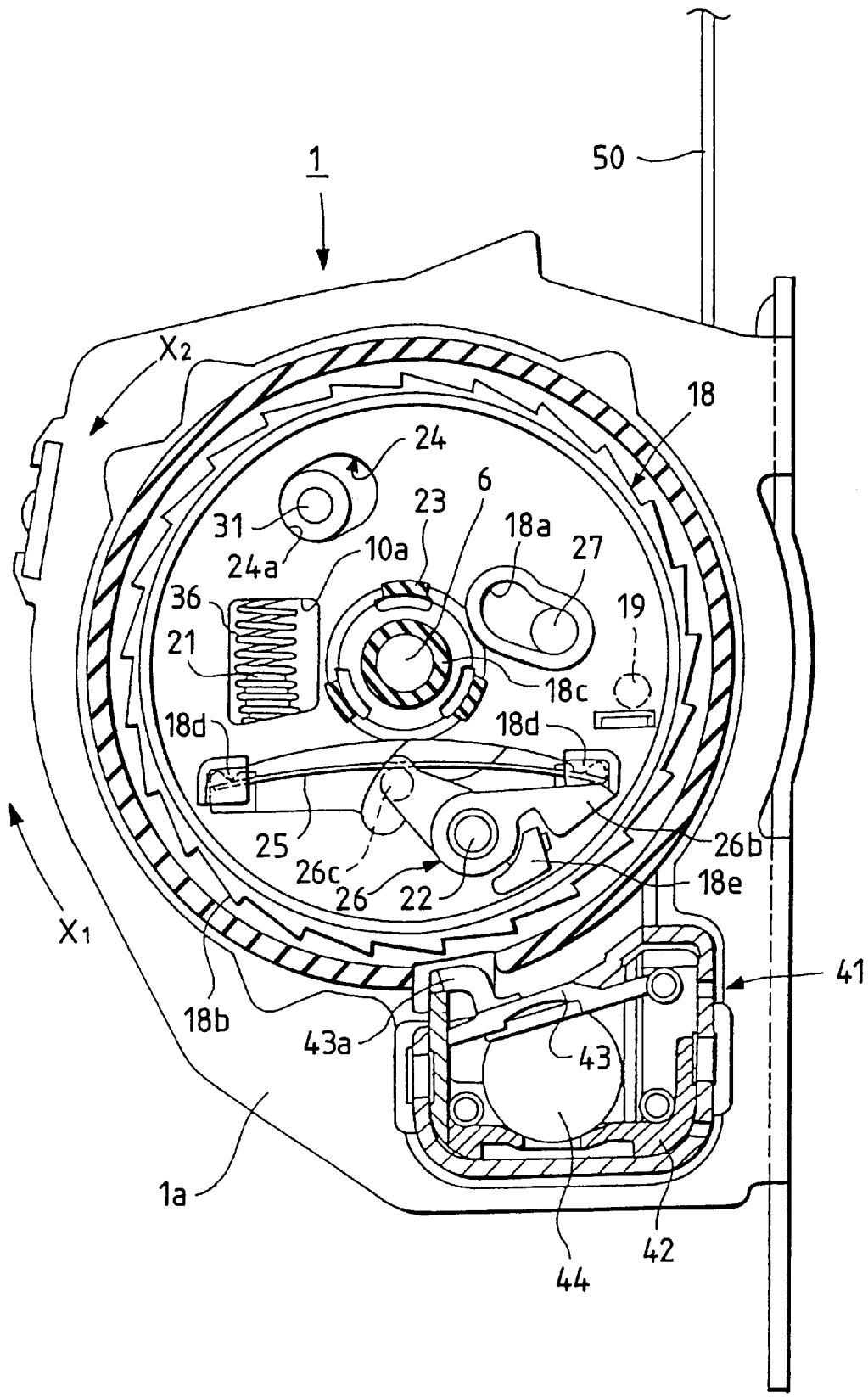
FIG. 6 is a cross-sectional view of the retractor for use with a seat belt taken on line D—D in FIG. 3.

As shown in FIG. 6, a shaft portion 22 for rotatably supporting the lock arm 26 is protruded on the outer side surface of the ratchet wheel 18. A holding protrusion 18e for preventing the lock arm 26 from rising is protruded also on the outer side surface of the ratchet wheel 18. A spring receiving portion 21 for holding one end portion of the compressive coil spring 36 is provided on the inner side surface of the ratchet wheel 18. The other end of the compressive coil spring 36 is held by an upper wall 10a of the accommodation recess 10 of the bobbin 3. The compressive coil spring 36 energizes the ratchet wheel 18 with respect to the bobbin 3 so that the bobbin can be rotated in the webbing drawing direction, that is, in the direction of arrow $X_2$. The first pressure receiving surface 5a, the ratchet wheel 18, the control pin 27 and the compressive coil spring all aid in constricting the relative movement of the pawl 16 and may be referred collectively as constrictors.

Figure 5:
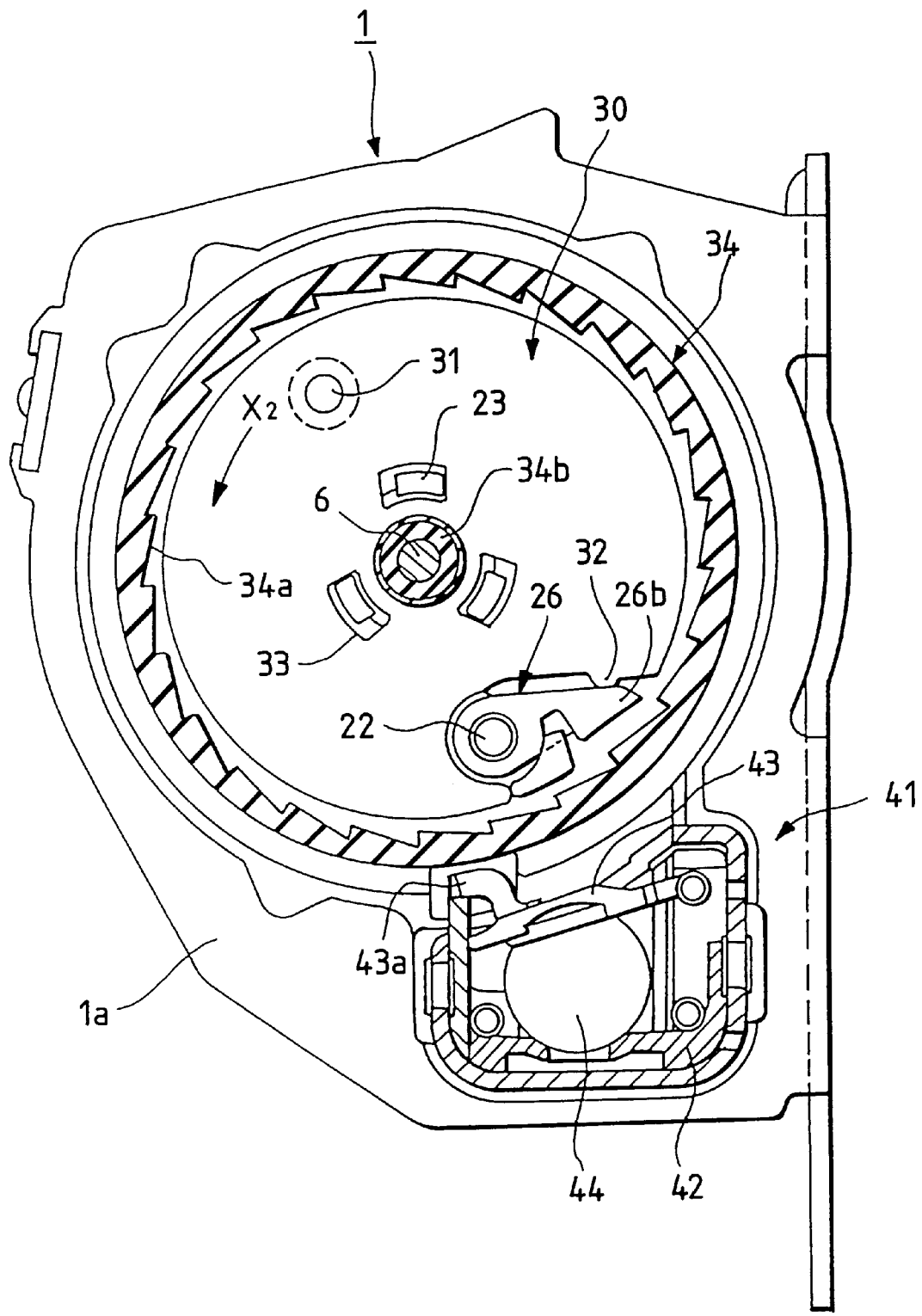
FIG. 5 is a cross-sectional view of the retractor for use with a seat belt taken on line C—C in FIG. 3.

The lock arm 26 includes: an arm portion 26c to push the center of a sensor spring 25 in the longitudinal direction, the shape of which is formed to be linear, the both ends of which are supported by a pair of hook portions 18d provided on the outer side surface of the ratchet wheel 18; and an engaging claw 26b capable of engaging with the inner teeth gear 34a in the gear case 34 described later. In the above arrangement, the lock arm 26 composes an engaging means for preventing the rotation of the ratchet wheel 18 in the webbing drawing direction when the engaging claw 26b engages with the inner teeth gear 34a. As shown in FIG. 5, the engaging claw 26b is pushed by a pushing protrusion 32 of the inertia plate 30 due to the pushing force of the sensor spring 25. In this connection, an opening which the arm 26c penetrates is formed in the ratchet wheel 18 corresponding to an oscillating range of the arm 26c. By this arrangement, the engagement of the arm 26c with the sensor spring 25 can be guaranteed.

On the support shaft 19 protruding from the inner side surface of the ratchet wheel 18, an oscillating lever member 20 is mounted in such a manner that a shaft hole 20a of the oscillating lever member 20 is engaged with the support shaft 19. In this case, the oscillating lever 20 is incorporated between the bobbin 3 and the ratchet wheel 18 so that a counterclockwise rotation of the oscillating lever 20 can be appropriately restricted by the engaging protrusion 8 which protrudes from the sensor side surface of the bobbin 3 and so that a clockwise rotation of the oscillating lever 20 can be appropriately restricted at the same time when the pushing protrusion 16d on the sensor side surface of the pawl 16 comes into contact with a portion between the support shaft 19 and the engaging protrusion 8.

A shaft support portion 34b (shown in FIG. 3) for rotatably supporting the bobbin 3 is formed at the center of the gear case 34 arranged outside the inertia pressure plate 30 provided. A bottom surface of the shaft support portion 34b is used as a surface to position the bobbin 3 in the rotational axis direction. A box-shaped accommodating section 40 is formed in the lower portion of the gear case 34 for accommodating a vehicle acceleration detecting means 41 which is an inertia detecting means for detecting the acceleration of a vehicle. The vehicle acceleration detecting means 41 is composed as follows. A ball weight 44 which is an inertial body is provided in the sensor case 42 fixed to the accommodating section 40. A sensor arm 43 is also provided in the sensor case 42, which serves as an engaging means having an engaging protrusion 43a capable of checking a rotation of the ratchet wheel 18 in the webbing drawing direction. The gear case 34 is fixed onto the base side plate 1a by an appropriate method.

A sensor cover 35 is provided outside the base side plate 1a that covers the gear case 34.

Next, the operation of the retractor for use with a seat belt will be explained below.

As shown in FIG. 6, in the normal operation, the ratchet wheel 18 is energized in the webbing drawing direction (the direction of arrow $X_2$) with respect to the bobbin 3 by the pushing force of the compression coil spring 36 attached between the spring receiving portion 21 and an upper wall 10a of the accommodation recess 10. The control pin 27, the end portions of which are engaged with the cam holes 18a, energizes the pawls 16, 13 in a direction so that the inner teeth 2a, 2b are not engaged.

That is, concerning the pawl 16 capable of loosely rotating around the support shaft 7, the engaging teeth 16c are energized in a direction so that the engaging teeth can not be engaged, by the sensor side end portion of the control pin 27 located at a position distant from the rotational center axis of the bobbin 3. At this time, the control pin 27 is arranged in the through-hole 29 while the control pin 27 can be oscillated around the engaging portion 27a. Accordingly, the end portion of the control pin 27 on the winding spring device side located at a position close to the rotational center axis of the bobbin 3 energizes the engaging teeth 16c of the pawl 13, which is capable of loosely rotating around the support shaft 12, in a direction so that the inner teeth 2b can not be engaged (shown in FIGS. 7 and 8). Therefore, the bobbin 3 can be rotated in the webbing drawing direction (the direction of arrow $X_2$) with respect to the base side plates 1a, 1b. Accordingly, it is possible to draw out the webbing 50.

As shown in FIG. 6, while the ball weight 44 in the vehicle acceleration detecting means 41 is set at a predetermined position in the sensor case 42, the engaging protrusion 43a of the sensor arm 43 is not engaged with the ratchet teeth 18b of the ratchet wheel 18, so that the ratchet wheel 18 follows the rotation of the bobbin 3.

As shown in FIG. 6, the engaging claw 26b of the lock arm 26 in the webbing acceleration detecting means is energized by a pushing force of the sensor spring 25 so that the engaging claw 26b can not be engaged with the inner teeth gear 34a in the gear case 34. The inertia plate 30 is energized by the engaging claw 26b with respect to the ratchet wheel 18 in the webbing drawing direction (the direction of arrow $X_2$). As shown in FIGS. 5 and 6, this inertia plate 30 is positioned in the rotating direction when the engaging protrusion 31 is pushed and energized by one end portion 24a of the long hole 24. Therefore, the inertia plate 24 is rotated integrally with the bobbin 3 via the ratchet wheel 18.

When the vehicle acceleration detecting means 41 or the webbing acceleration detecting means, which is an inertia detecting means for operating in the case of an emergency of a vehicle, is operated, the sensor arm 43 or the lock arm 26, which is an engaging means for checking the rotation of the lock operation means in the webbing drawing direction, checks the rotation of the ratchet wheel 18 in the webbing drawing direction, and the lock means of the retractor is operated.

First, operation of the lock operation means will be explained as follows in the case where a vehicle speed is changed by a speed changing rate not less than a predetermined value in the case of an emergency such as a collision, and the lock means of the retractor is operated by the vehicle acceleration detecting means 41.

Figure 7A:
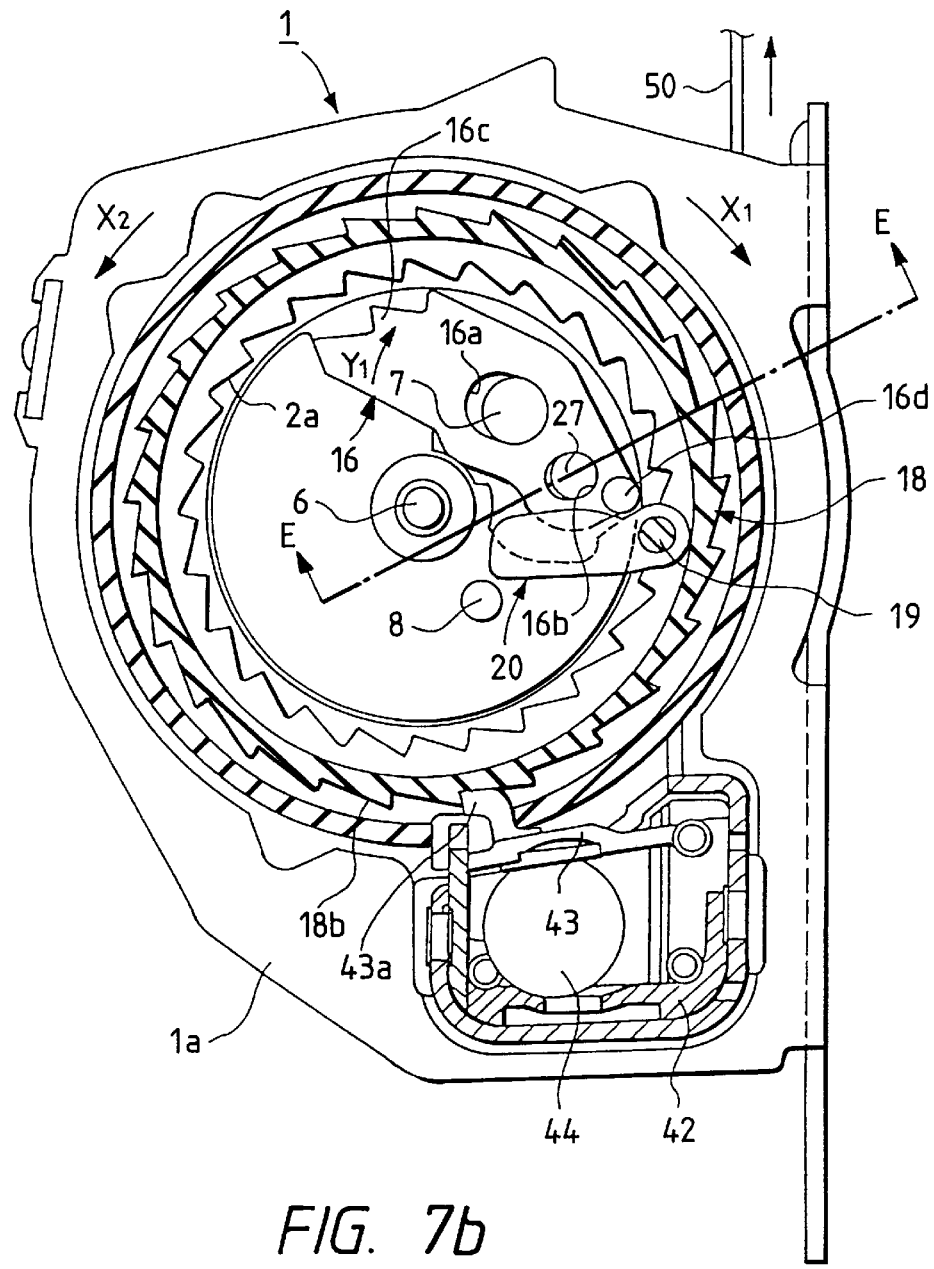
FIG. 7a is an enlarged cross-sectional view of the primary portion on the sensor side of the retractor for use with a seat belt shown in FIG. 3, in which the view explains a lock operation conducted by a vehicle acceleration detecting means so as to prevent the webbing from being drawn out.
Figure 7B:
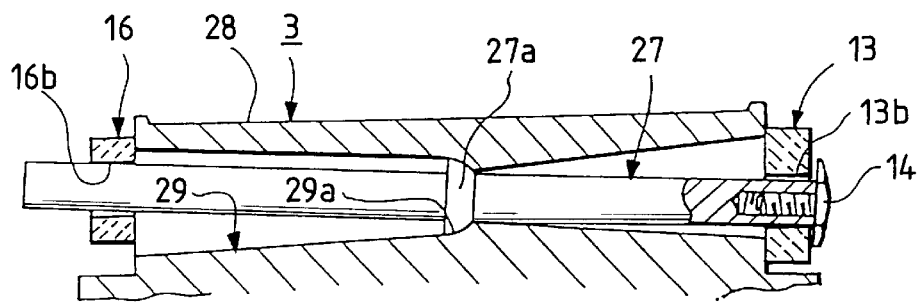
FIG. 7b is a cross-sectional view taken on line E—E showing a state of the control pin at that time.

In the case where a vehicle speed is changed by a speed m changing rate not less than a predetermined value in the case of an emergency such as a collision, the ball weight 44 of the vehicle acceleration detecting means 41 detects an acceleration of the vehicle and rolls. Then the sensor arm 43 is oscillated in a direction in which the engaging protrusion 43a is engaged with the ratchet teeth 18b of the ratchet wheel 18. When the webbing is drawn out from the retractor in accordance with the movement of the upper part of the body of a passenger, the bobbin 3 is rotated in the webbing drawing direction (the direction of arrow $X_2$). At this time, the ratchet wheel follows the rotation of the bobbin 3. However, when the engaging protrusion 43a is completely engaged with the ratchet teeth 18b as shown in FIG. 7, the rotation of the ratchet wheel 18 in the webbing drawing direction is checked at this point of time.

When the webbing 50 is further drawn out from the retractor, the rotation of the ratchet wheel 18 lags behind the rotation of the bobbin 3, so that the ratchet wheel 18 relatively rotates in the webbing winding direction (the direction of arrow $X_1$). Accordingly, the cam hole 18a of the ratchet wheel 18 moves an end portion of the control pin 27 on the sensor side toward the rotational center axis of the bobbin 3. At this time, the pawl 16 is oscillated around the support shaft 7 in the direction in which the pawl 16 is engaged with the inner teeth 2a, that is, in the direction of arrow $Y_1$. Since the control pin 27 is arranged in the pin through-hole 29 so that the control pin 27 can be oscillated around the engaging portion 27a, an end portion of the control pin 27 on the winding spring device side moves in a direction in which the end portion is separated from the rotational center axis of the bobbin 3 and pushes the long hole 13b of the pawl 13. Accordingly, the pawl 13 is oscillated around the support shaft 12 in a direction in which the pawl 13 is engaged with the inner teeth 2b, that is, in the direction of arrow $Y_2$. As described above, both end portions of the control pin 27 are respectively moved in the opposite directions while the control pin 27 oscillates around the engaging portion 27a.

When the webbing 50 is further drawn out from the retractor, as shown in FIG. 9, the engaging teeth 16c, 13c of both pawls 16, 13 are respectively, simultaneously engaged with the inner teeth 2a, 2b. Under the above condition, a clearance is formed between the pawl rear end portion 16e, 13e of each pawl 16, 13 and the pressure receiving surface 5, 4 of the bobbin 3. The rotation of the oscillation lever member 20 is restricted by the engaging protrusion 8 of the bobbin 3 and the pushing protrusion 16d of the pawl 16 while no play is substantially provided between them.

In this case, the shaft holes 16a, 13a of the pawls 16, 13 are respectively, loosely engaged with the support shafts 7, 12 of the bobbin 3, so that the pawls 16, 13 are supported by the bobbin 3 while the pawls 16, 13 can be oscillated and relatively moved by a predetermined distance. Accordingly, when the webbing 50 is further drawn out from the retractor, the pawls 16, 13 are relatively rotated around the rotational center shaft of the bobbin 3 until the rear end portions 16e, 13e respectively come into contact with the pressure receiving surfaces 5, 4.

At this time, a positional relation between the pushing protrusion 16d of the pawl 16 and the base side plate 1a is not changed, however, the engaging protrusion 8 of the bobbin 3 is rotated in the webbing drawing direction, that is, in the direction of arrow $X_2$. Due to the foregoing movement, an oscillating end portion of the oscillating lever member 20 is pushed by the engaging protrusion 8 with a fulcrum of the contact point with the pushing protrusion 16d. When the oscillating lever member 20 is oscillated clockwise, the shaft hole 20a rotates in the webbing winding direction (the direction of arrow $X_1$) with respect to the rotational center axis of the bobbin 3. As a result, the ratchet wheel 18, which is engaged with the shaft hole 20a via the support shaft 19, is reversed in the webbing winding direction (the direction of arrow $X_1$) with respect to the bobbin 3.

Accordingly, as shown in FIG. 10, a clearance is formed in the engagement between the engaging protrusion 43a of the sensor arm 43 in the vehicle acceleration detecting means 41 and the ratchet teeth 18b of the ratchet wheel 18. That is, even in a lock condition in which the lock means of the retractor prevents the bobbin 3 from rotating in the webbing drawing direction, it is possible to provide a free condition in which the engaging protrusion 43a of the sensor arm 43 in the vehicle acceleration detecting means can be released from the engagement with the ratchet teeth 18b of the ratchet wheel 18. When a speed change, the rate of which is not less than a predetermined value, is not given to the vehicle, the ball weight 44 returns to the position shown in FIG. 6. When the ball weight 44 returns to the position shown in FIG. 6, the sensor arm 43, which is in the above free condition, is oscillated downward by the action of its weight.

After the vehicle has stopped and the tension acting on the webbing 50 has been released, the ratchet teeth 18*b* are disengaged from the engaging protrusion 43*a*. Since this ratchet wheel 18 is rotated in the direction of arrow $X_2$ with respect to the bobbin 3 by the pushing force of the compression coil spring 36, the cam hole 18*a* of the ratchet wheel 18 moves an end portion of the control pin 27 on the sensor side in a direction in which the end portion is separated from the rotational center axis of the bobbin 3. At this time, a tension given to the webbing 50 in the drawing direction is released as described before and the bobbin 3 can be rotated in the webbing winding direction (the direction of arrow $X_1$). Accordingly, when the bobbin 3 is rotated in the direction of arrow $X_1$ so that the front ends of the engaging teeth 16*c*, 13*c* can not interfere with the front ends of the inner teeth 2*a*, 2*b*, the pawls 16, 13 are oscillated around the support shafts 7, 12 in a direction in which the engagement with the inner teeth 2*a*, 2*b* is released. Therefore, the bobbin 3 is unlocked, and the webbing can be loosely drawn out.

Figure 11:
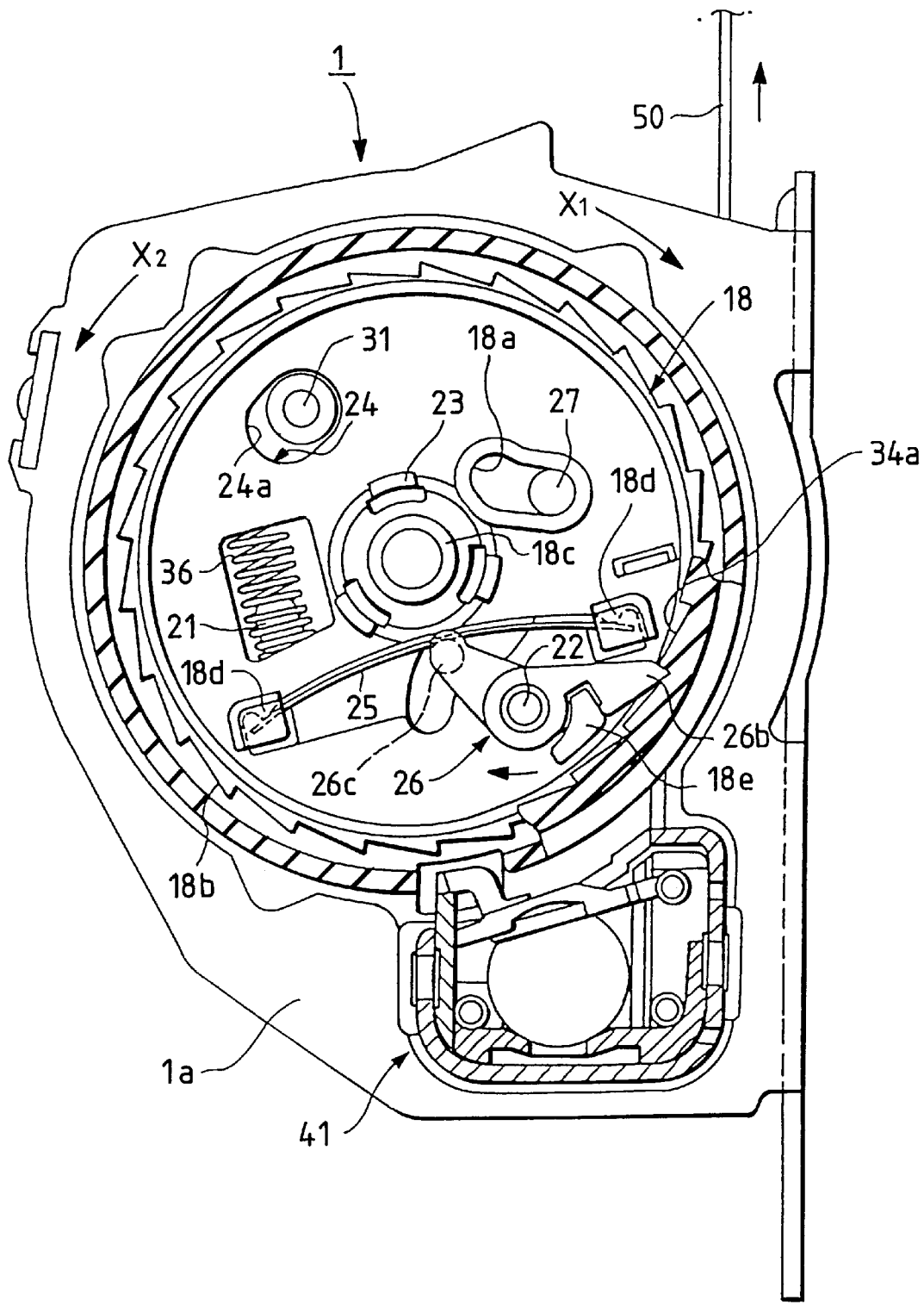
FIG. 11 is an enlarged cross-sectional view of the primary portion on the sensor side of the retractor for use with a seat belt shown in FIG. 3, in which the view explains a lock operation conducted by a vehicle acceleration detecting means so as to prevent the webbing from being drawn out.

Next, referring to FIGS. 5 and 11, operation of the lock operation means will be explained below when the webbing is drawn out at a drawing speed not less than a predetermined value in the case of an emergency such as a collision and also when the lock means of the retractor is operated by the webbing acceleration detecting means.

When the upper part of the body of a passenger is moved in the case of an emergency such as a collision, a tension is applied to the webbing 50, and the bobbin 3 is given an impulsive torque, the intensity of which is higher than a predetermined value, in the webbing drawing direction (the direction of arrow $X_2$). Then the inertia plate 30 is relatively rotated and displaced by the inertia in an opposite direction (the direction of arrow $X_1$) to the direction of arrow $X_2$ of the rotation of the ratchet wheel 18. Then the pushing protrusion 32 of the inertia plate 30 rotates the lock arm 26 clockwise in FIG. 11 around the shaft portion 22, resisting the pushing force of the sensor spring 25. Therefore, the lock arm 26 is oscillated in a direction in which the engaging claw 26*b* is engaged with the inner teeth gear 34*a* in the gear case 34. Next, when the upper part of the body of a passenger is further moved, the webbing is drawn out from the retractor. At this time, the bobbin 3 is rotated in the webbing drawing direction (the direction of arrow $X_2$), and the ratchet wheel 18 follows the rotation of the bobbin 3. However, as shown in FIG. 11, when the engaging claw 26*b* completely engages with the inner teeth gear 34*a*, the rotation of the ratchet wheel 18 in the webbing drawing direction is stopped at this point of time.

When the webbing 50 is further drawn out from the retractor, the rotation of the ratchet wheel 18 lags behind the rotation of the bobbin 3, so that the ratchet wheel 18 relatively rotates in the webbing winding direction (the direction of arrow $X_1$). Accordingly, the cam hole 18*a* of the ratchet wheel 18 moves an end portion of the control pin 27 on the sensor side toward the rotational center axis of the bobbin 3. At this time, the pawl 16 is oscillated around the support shaft 7 in the direction in which the pawl 16 is engaged with the inner teeth 2*a*, that is, in the direction of arrow $Y_1$. Since the control pin 27 is arranged in the pin through-hole 29 so that the control pin 27 can be oscillated around the engaging portion 27*a*, an end portion of the control pin 27 on the winding spring device side moves in a direction in which the end portion is separated from the rotational center axis of the bobbin 3 and pushes the long hole 13*b* of the pawl 13. Accordingly, the pawl 13 is oscillated around the support shaft 12 in a direction in which the pawl 13 is engaged with the inner teeth 2*b*, that is, in the direction of arrow $Y_2$. As described above, both end portions of the control pin 27 are respectively moved in the opposite directions while the control pin 27 oscillates around the engaging portion 27*a*.

After that, in the same manner as that of the operation of the ratchet wheel 18 in the case of operation conducted by the vehicle acceleration detecting means 41 described before, the lock means is operated, so that the rotation of the bobbin 3 in the webbing drawing direction is checked, and the ratchet wheel 18 is reversed in the webbing winding direction (the direction of arrow $X_1$) with respect to the bobbin 3.

Accordingly, a clearance is formed in the engagement between the engaging claw 26*b* of the lock arm 26 in the webbing acceleration detecting means and the inner teeth gear 34*a* in the gear case 34. The lock arm 26 is energized by a pushing force of the sensor spring 25 in a direction in which the engaging claw 26*b* is not engaged with the inner teeth gear 34*a*, that is, the lock arm 26 is energized counterclockwise in FIG. 11. Therefore, as a result of the formation of the above clearance, the lock arm 26 is rotated in a direction in which the engaging claw 26*b* is disengaged from the inner teeth gear 34*a*. That is, even in a lock condition in which the lock means of the retractor prevents the bobbin 3 from rotating in the webbing drawing direction, it is possible to release the engaging claw 26*b* of the lock arm 26 in the webbing acceleration detecting means from the engagement with the inner teeth gear 34*a* in the gear case 34.

When the tension applied to the webbing 50 is released, the ratchet wheel 18 in which the engaging claw 26*b* has already been released from the inner teeth gear 34*a* is rotated in the direction of arrow $X_2$ with respect to the bobbin 3 by the energizing force of the compression spring 36. Accordingly, the cam hole 18*a* of the ratchet wheel 18 moves the end portion of the control pin 27 on the sensor side in a direction in which the end portion of the control pin 27 is separated from the rotational center axis of the bobbin 3. Then, in the same manner as that of the unlocking operation conducted by the vehicle acceleration detecting means 41, the pawls 16, 13 are oscillated in a direction in which the engagement of the pawls 16, 13 with the inner teeth 2*a*, 2*b* can be released, so that the bobbin 3 is unlocked and the webbing can be loosely drawn out.

Even when the vehicle acceleration detecting means 41 or the webbing acceleration detecting means is operated by a shock caused when all webbing 50, which has been drawn out, is suddenly wound by a force of the winding spring device 15, so that the rotation of the bobbin 3 in the webbing drawing direction is locked and the retractor is put into an end lock state in which the webbing can be neither drawn out nor wound up, the engaging forces of the pawls 16, 13 with the inner teeth 2*a*, 2*b* are generated only by the engagement between them. Therefore, in order to release the engagement of the pawls 16, 13 with the inner teeth 2*a*, 2*b*, it is necessary for the bobbin 3 to be rewound only by a small amount of rotation corresponding to half a tooth of the inner teeth 2*a*, 2*b*. The bobbin 3 is rewound only by a small amount of rotation in such a manner that the webbing 50, which has been wound being formed into layers in a state of end lock, is forcibly drawn out so that the webbing 50 can be tightened, and this webbing 50, which has been forcibly drawn out, is wound again. When a small amount of webbing is rewound as described above, no resisting force is activated to the compression coil spring 36 which pushes the ratchet wheel 18 in the direction of arrow $X_2$ with respect to the bobbin 3. Accordingly, the ratchet wheel 18 is pushed by the pushing force of the coil spring 36 in the direction of arrow $X_2$, so that the unlocking operation can be conducted.

Accordingly, in the above retractor for use with a seat belt, the reverse rotation control means for controlling the ratchet wheel 18 to release the end lock state easily includes: a pawl 16 supported in such a manner that the pawl 16 can be relatively moved with respect to the bobbin by a predetermined distance; and an oscillating lever member 20 rotatably arranged between the bobbin 3 and the ratchet wheel 18 so that the ratchet wheel 18 can be reversed in the webbing winding direction by a relative movement of the pawl 16 with respect to the bobbin 3. Since a complicated cam shape is not required for the ratchet wheel 18 and the oscillating lever member 20, it is not necessary to machine each component with high accuracy, and also it not necessary to enhance the assembling accuracy.

In the retractor for use with a seat belt of this embodiment, explanations are made for a lock means in which a pair of pawls 16, 13 arranged at both ends of the bobbin 3 around which the webbing 50 is wound are engaged with the inner teeth 2a, 2b of the retractor base so that the rotation of the bobbin 3 in the webbing drawing direction can be checked. However, it should be noted that the reverse rotation control means of the lock operation means of the present invention does not necessarily require a pair of engaging members, but the reverse rotation control means is also effective for a retractor for use with a seat belt in which the engaging member is arranged at least one end of the winding shaft.

Figure 12:
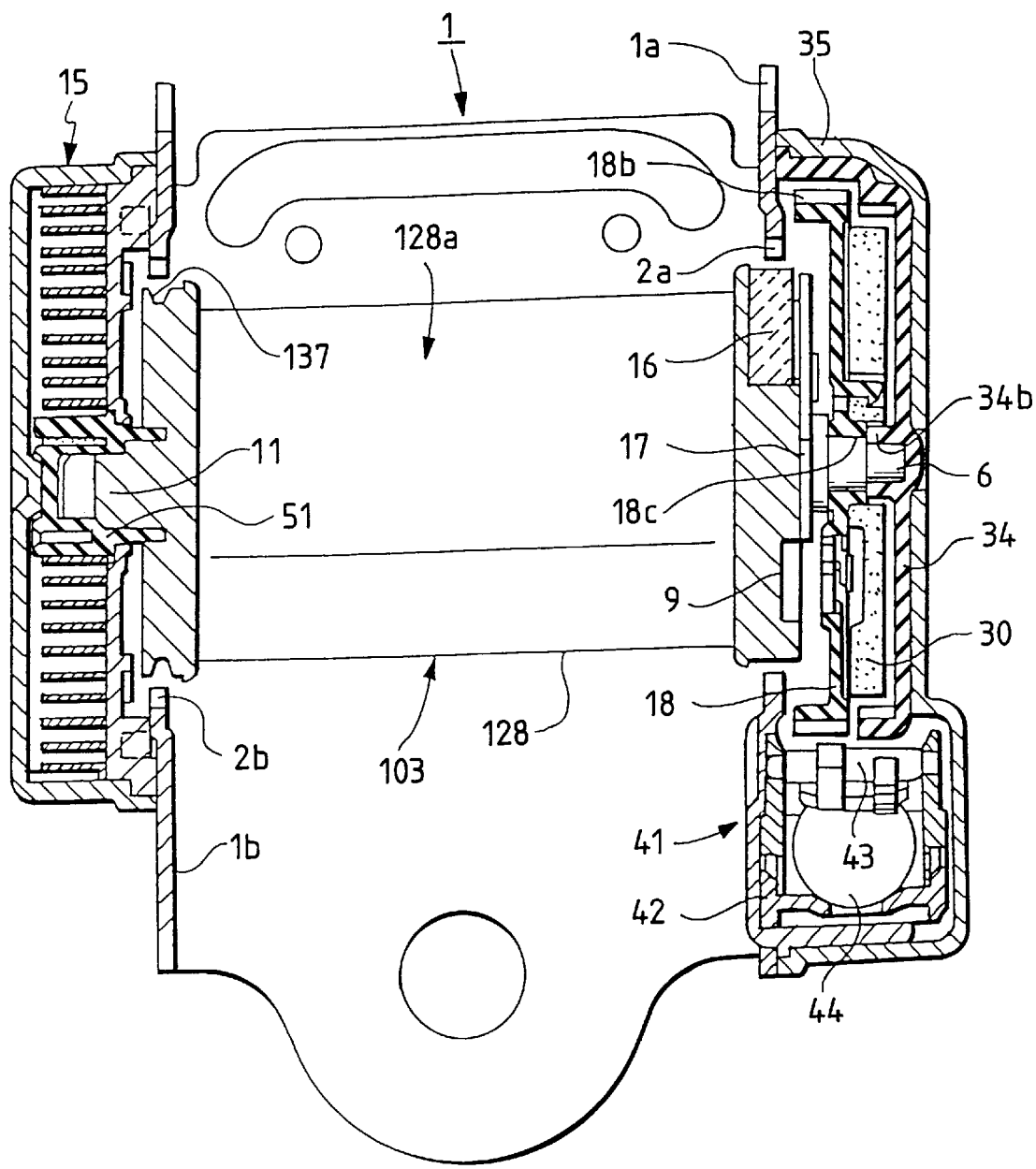
FIG. 12 is a longitudinal front cross-sectional view of the retractor for use with a seat belt according to the second embodiment of the present invention.
Figure 14A:
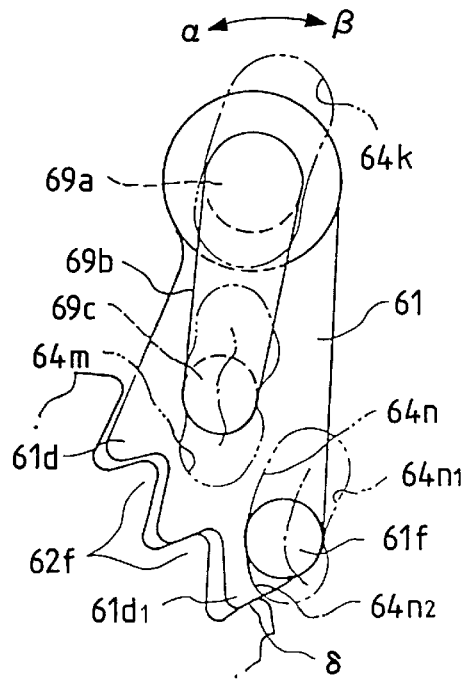
FIGS. 14a and 14b explain the operation of the main pawl and the lock gear of the conventional lock means.
Figure 14B:
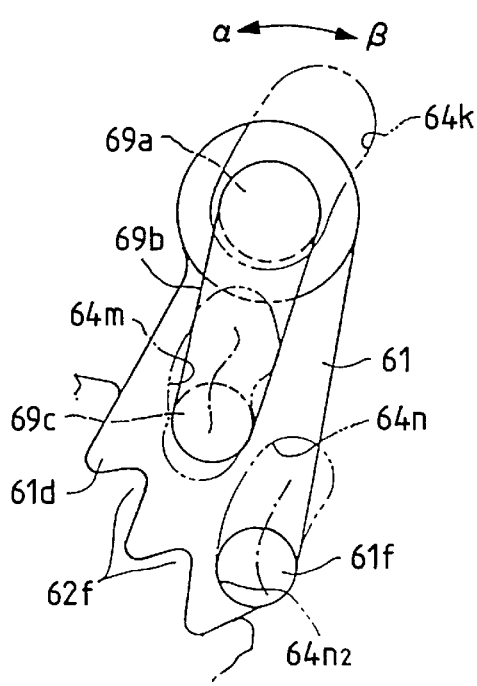
Figure 15:
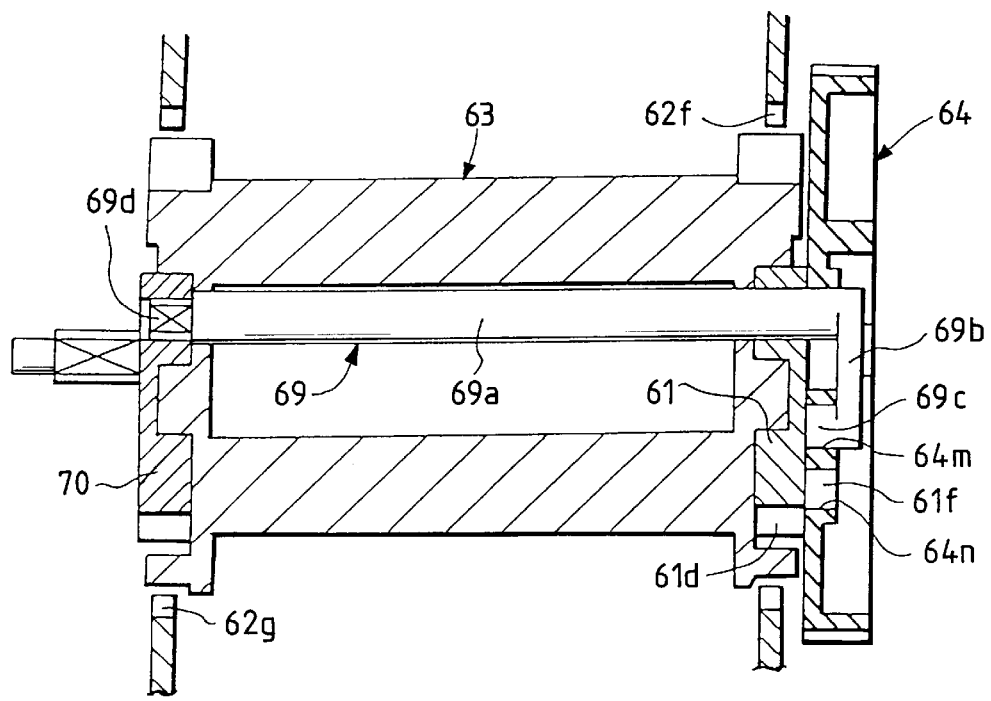
FIG. 15 is a cross-sectional view of a conventional retractor for use with a seat belt schematically illustrating its primary portion.
Figure 16:
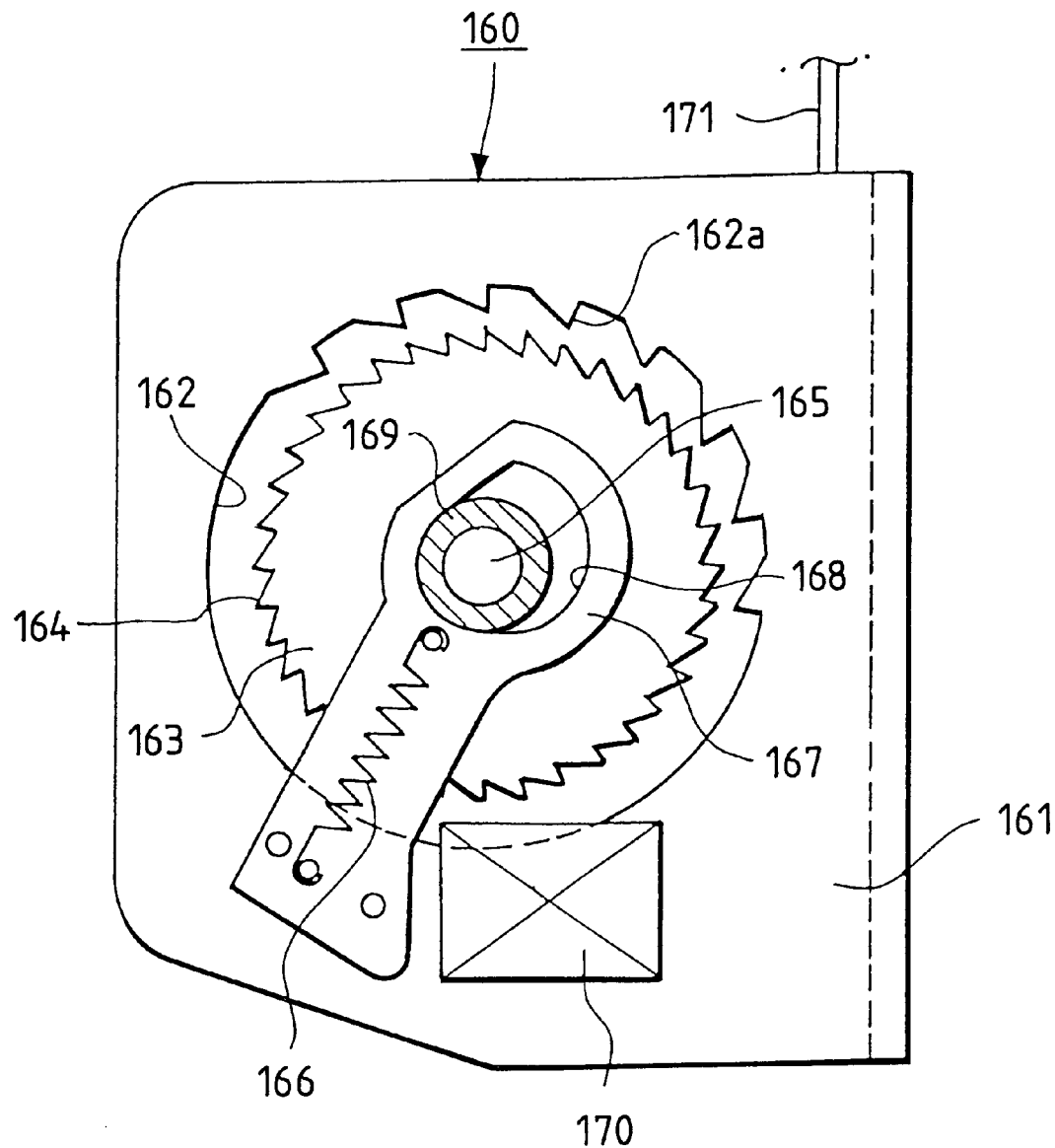
FIG. 16 is a side view of another conventional retractor for use with a seat belt illustrating its general construction.

Next, referring to FIGS. 12 and 13, the second embodiment of the present invention will be explained below.

In this connection, like reference characters are used to indicate like parts in the first embodiment and the second one, and the detailed explanations are omitted here.

In the second embodiment, the pawl 13 is omitted which is arranged on the winding spring device side of the bobbin 3 in the first embodiment. Due to the foregoing, the shape of the bobbin 103 is changed in the second embodiment.

As shown in FIG. 13, a substantially V-shaped annular engaging groove 137 is formed on the outer circumference of the edge portion of the bobbin 103 corresponding to the inner teeth 2b provided in the through-hole of the base side plate 1b. The annular engaging groove 137 serves as an annular engaging surface capable of engaging with the inner teeth 2b.

In the case of an emergency of a vehicle, as explained in the first embodiment, the pawl 16 is engaged with the inner teeth 2a formed on the base side plate 1a, so that the rotation of the bobbin 103 in the web drawing direction can be checked. When a webbing drawing force, the intensity of which is higher than a predetermined value, is applied to the webbing, the rotational support shaft 11 side of the bobbin 103 moves upward in FIG. 12 while the retainer 51 of the winding spring device 15 is being deformed. Due to the above movement, the annular engaging groove 137 formed on the bobbin 103 is engaged with the inner teeth 2b. Since the section of the annular engaging groove 137 is substantially V-shaped, the inner teeth 2b can easily bite into the outer circumferential end portion of the bobbin 103.

As shown in FIG. 13a, the bottom width L of the substantially V-shaped annular engaging groove 137 is set at a value smaller than the thickness T of the base side plate 1b, that is, the bottom width L is set at a value that is half of the thickness T. Therefore, as shown in FIG. 13b, when the bobbin 103 moves to an upper lock position and comes into contact with the inner teeth 2b of the base side plate 1b, an edge of the inner teeth 2b is contacted with an inclined surface of the annular engaging groove 137. Due to the above arrangement, the inner teeth 2b can easily bite into the outer circumferential edge portion of the bobbin 103 by the wedge effect. When the inner teeth 2b bites into the annular engaging groove 137, it is possible to prevent the bobbin 103 from moving in the thrust direction in the case of locking operation.

In the same manner as that of the retractor for use with a seat belt of the first embodiment, in the retractor for use with a seat belt of the second embodiment, an engaging force to resist the webbing drawing force, the intensity of which is higher than a predetermined value, applied to the webbing in the case of a collision can be supported by both base side plates 1a, 1b. Accordingly, as compared with a case in which an excessively high engaging force is supported only by the lock means of the emergency lock mechanism arranged at one end portion of the bobbin, it is possible to reduce the mechanical strength of the lock means, and it is also possible to enhance the degree of freedom of design of the retractor for use with a seat belt. In the normal operation, the rotational support shaft of the bobbin 103 can be stably rotated, and an increase in the number of components of the retractor can be prevented.

In this connection, in the second embodiment, a substantially V-shaped annular engaging groove 137 is formed on the outer circumference of the end portion of the bobbin 103. However, it is not necessary to provide this type groove, but the outer circumference of the end portion of the bobbin may be formed into a simple cylindrical annular surface.

Even in this case, since the bobbin is made of metal such as aluminum which is relatively softer than the retractor base, the inner teeth formed on the base side plate bite into the annular surface. Due to the foregoing, the rotation of the bobbin in the webbing drawing direction can be prevented and also the movement in the thrust direction can be prevented in the same manner as that of the second embodiment.

In order to cause the inner teeth to easily bite into the annular surface, the annular surface may be subjected to knurling.

What is claimed is:

1. A retractor for use with a seat belt, comprising:
    a retractor base;
    a winding shaft rotatable mounted on said retractor base and around which webbing is wound;
    an engaging member, arranged on at least one end of the winding shaft;
    an emergency lock mechanism including:
        an inertia detector to be operated in the case of an emergency movement of a vehicle;
        a ratchet wheel, connected to the winding shaft and relatively rotatable with respect to the winding shaft about an axis of the winding shaft;
        a checking mechanism for preventing the rotation of the ratchet wheel in a webbing drawing direction in accordance with the operation of the inertia detector; and
        a locking mechanism for engaging the engaging member with a portion to be engaged on said retractor base and thus preventing the winding shaft from rotating in the direction of drawing out the webbing from the winding shaft in accordance with the operation of the checking mechanism;
    a support, on said at least one end of the winding shaft, for supporting the engaging member so that the engaging member can be relatively moved with respect to the winding shaft in the winding shaft rotating direction by a predetermined amount of rotation; and a reverse rotation control mechanism, which rotates the ratchet wheel in a webbing winding direction by the rotation of the winding shaft in the webbing drawing direction relative to said engaging member, the operation of which is caused by rotating the winding shaft in a webbing drawing direction after the engaging member is engaged with said portion to be engaged on the retractor base, to thereby facilitate a cancellation of an end lock state of the retractor.

2. The retractor for use with a seat belt according to claim 1, wherein the reverse rotation control mechanism includes an oscillating lever, one end portion of which is connected with the ratchet wheel, the middle portion of which is engaged with the engaging member, and the other end portion of which is engaged with the winding shaft such that the oscillating lever can be oscillated about a substantially central portion of the oscillating lever.

3. The retractor for use with a seat belt according to claim 1, wherein the support for supporting the engaging member includes a support shaft arranged at a position eccentric to the axial center of the winding shaft, a shaft hole loosely engaged with the support shaft is formed in the engaging member, and constrictors for constricting a relative movement of the engaging member in the winding shaft rotating direction in normal operation of the retractor.

4. The retractor for use with a seat belt according to claim 1, wherein the ratchet wheel is structured to be relatively rotated in the webbing winding direction by further rotation of the winding shaft in the webbing drawing direction after the engaging member has been completely and securely engaged with said portion to be engaged on the retractor base so that end lock state is released.

5. A retractor for use with a seat belt, comprising:

a retractor base;

a winding shaft rotatable mounted on said retractor base and around which webbing is wound;

a pair of engaging members, with one of said pair of engaging members arranged at each end of the winding shaft;

an emergency lock mechanism including:
　a lock operator, connected to the winding shaft and relatively rotatable with respect to the winding shaft about an axis of the winding shaft, responsive to an emergency movement of a vehicle; and
　a locking mechanism for engaging the pair of engaging members with portions to be engaged on said retractor base and thus preventing the winding shaft from rotating in the direction of drawing out the webbing from the winding shaft in accordance with the operation of the lock operator;

wherein the pair of engaging members are respectively engaged with both end portions of a control pin substantially extending in parallel with an axis of the winding shaft and arranged in the winding shaft such that the control pin can be oscillated about a substantially central portion of the control pin, said control pin being structured to be oscillated by the lock operator and wherein when the control pin is oscillated by the lock operator, the control pin causes the pair of engaging members to engage with said portions to be engaged on the retractor base.

\* \* \* \* \*